US008374981B2

(12) United States Patent
Shigemori

(10) Patent No.: US 8,374,981 B2
(45) Date of Patent: Feb. 12, 2013

(54) APPARATUS AND METHOD FOR CONSTRUCTING PREDICTION MODEL

(75) Inventor: Hiroyasu Shigemori, Kanagawa (JP)

(73) Assignee: JFE Steel Corporation, Tokyo (JP)

( * ) Notice: Subject to any disclaimer, the term of this patent is extended or adjusted under 35 U.S.C. 154(b) by 985 days.

(21) Appl. No.: 12/087,568

(22) PCT Filed: Oct. 20, 2006

(86) PCT No.: PCT/JP2006/321450
§ 371 (c)(1),
(2), (4) Date: Jul. 10, 2008

(87) PCT Pub. No.: WO2007/080688
PCT Pub. Date: Jul. 19, 2007

(65) Prior Publication Data
US 2009/0083206 A1    Mar. 26, 2009

(30) Foreign Application Priority Data

Jan. 13, 2006  (JP) .................................. 2006-006127

(51) Int. Cl.
*G06N 5/00* (2006.01)
(52) U.S. Cl. ........................................................ 706/45
(58) Field of Classification Search ..................... 706/45
See application file for complete search history.

(56) References Cited

U.S. PATENT DOCUMENTS
6,157,899 A    12/2000  Venkataraman et al.
2005/0288812 A1    12/2005  Cheng et al.

FOREIGN PATENT DOCUMENTS
| JP | 6-95707 A | 4/1994 |
| JP | 2001-2905208 A | 10/2001 |
| JP | 2002-157572 A | 5/2002 |
| JP | 2003-305508 A | 10/2003 |
| JP | 2004-355189 A | 12/2004 |

OTHER PUBLICATIONS

Ito, M., Matsuzaki, S., Ogai, H., Mori, K, Uchida, K., Saito, S., and Sasaki, N., "Application of Large scale database-based Online Modeling of Blast Furnace operation", in Proc. 16th IFAC World Congress, Prague, CD-ROM, Jul. 2005.*
Bontempi et al ("Lazy Learning for Local Modeling and Control Design" 1999).*
Extended European Search Report (EESR) dated Apr. 4, 2011 (in English) in counterpart European Application No. 06822419.5.

* cited by examiner

*Primary Examiner* — Lut Wong
(74) *Attorney, Agent, or Firm* — Holtz, Holtz, Goodman & Chick, PC

(57) ABSTRACT

A prediction model constructing apparatus includes a operational result database, similarity calculating means, and prediction model constructing means. The operational result database relates manufacturing conditions of a product manufactured in the past to result information on the manufacturing, and stores a plurality pieces of information obtained by relating the manufacturing conditions to the result information. The similarity calculating means calculates a similarity composed of a plurality of comparison results by comparing the manufacturing conditions stored in the operational result database with a manufacturing condition of a prediction target. The prediction model constructing means determines a parameter of a prediction model corresponding to the manufacturing condition of the prediction target.

8 Claims, 20 Drawing Sheets

DATABASE MODELING

PREDICTION OF OUTPUT VALUE FROM SIMILAR EXAMPLE CORRESPONDING TO INPUT VALUE

APPARATUS AND METHOD FOR CONSTRUCTING PREDICTION MODEL

This application is a U.S. National Phase Application under 35 USC 371 of International Application PCT/JP2006/321450 filed Oct. 20, 2006.

FIELD OF THE INVENTION

The present invention relates to an apparatus and a method for constructing predication model. More specifically, the present invention pertains to a method for constructing predication model suitable for being used in a factory in which a cast steel material is subjected to heating, rolling, cooling, and heat treating to thereby build in the quality of products.

DESCRIPTION OF THE RELATED ARTS

In predicting a result corresponding to a manufacturing conditions (hereinafter, referred to as a query) for which the user wishes to predict, on the basis of a operational result database storing manufacturing conditions and corresponding results, a method has been hitherto proposed wherein, as shown in FIG. 1, similarity between a query and each sample in the operational result database 10 is calculated, and based on this similarity, the result corresponding to the query is predicted using average value calculation, regression model construction, and neural network (refer to Patent Documents 1 to 3).

[Patent Document 1] Japanese Unexamined Patent Application Publication No. 2001-290508
[Patent Document 2] Japanese Unexamined Patent Application Publication No. 2002-157572
[Patent Document 3] Japanese Unexamined Patent Application Publication No. 2004-355189

The term "result" here refers to quality property values such as a dimension (thickness, width, length or the like), material (tensile strength, yield point, elongation, toughness or the like), or shape; inferior quality incidence rate such as a detection ratio of defects; and a manufacturing process index such as production efficiency, a lead time (time from order-receipt to delivery), or a manufacturing cost.

However, in conventional prediction methods, as shown in FIG. 2, there has been a problem that, although the predictive accuracy in an interpolation region having result data is good, the predictive accuracy in an extrapolation region having no result data is not good.

As a result, for quality design when developing a new product, or for control when a manufacturing condition departs from a management range, the conventional art cannot be used. Therefore, the prediction in the extrapolation region has resorted to knowledge and experiences of an expert having rich experiences in a target.

SUMMARY OF THE INVENTION

The present invention has been made for solving the above-described conventional problem. It is an object of the present invention to predict a result in the extrapolation region with high accuracy.

In order to achieve the object, the present invention provides an apparatus for constructing a prediction model, comprising:

an operational result database that relates manufacturing conditions of products manufactured in the past to result information on the manufacturing, and that stores a plurality pieces of information obtained by relating the manufacturing conditions to the result information;

similarity calculating means for calculating similarity composed of a plurality of comparison results by comparing the manufacturing conditions stored in the operational result database with a manufacturing condition of a prediction target; and prediction model constructing means for determining a parameter of a prediction model corresponding to the manufacturing condition of the prediction target, wherein, when the prediction model constructing means establishes the relationship between a manufacturing condition and a manufacturing result on the basis of the manufacturing conditions and the result information of the operational result database, the prediction model constructing means comprises:

means for using the similarity as a weight of an evaluation function for evaluating a modeling error of the result information, and means for using a physical characteristic of the prediction target as a constraint condition to thereby solve a mathematical programming problem concerning the evaluation function within the constraint condition.

The prediction model constructing apparatus according to the present invention preferably further includes a result prediction device. The result prediction device includes prediction model acquiring means for acquiring prediction model corresponding to the manufacturing conditions of the prediction target; and result prediction means for predicting a result corresponding to the manufacturing condition by inputting the manufacturing conditions of the prediction target into the prediction model.

The prediction model constructing apparatus according to the present invention preferably further includes a control device for controlling the manufacturing conditions. The control device includes prediction model acquiring means for acquiring prediction model corresponding to the manufacturing conditions of the prediction target; and control means for performing control by calculating, using the prediction model, an control input such that a controlled variable attains a target value with respect to the manufacturing conditions of the prediction target.

The prediction model constructing apparatus according to the present invention preferably further includes a quality design device. The quality design device includes prediction model acquiring means for acquiring prediction model corresponding to the manufacturing conditions of the prediction target; and quality design support means for supporting the quality design of a product by outputting at least one output out of the output of a predicted result obtained by inputting one or more manufacturing conditions into the prediction model, and the output of a secondary evaluation index calculated based on the predicted result.

Furthermore, the present invention provides a method for constructing a prediction model, comprising:

a similarity calculating step of comparing manufacturing conditions stored in a operational result database that relates manufacturing conditions of products manufactured in the past to result information on the manufacturing and that stores a plurality pieces of information obtained by relating the manufacturing conditions to the result information, with a manufacturing condition of a prediction target, to thereby calculate a similarity composed of a plurality of comparison results; and prediction model constructing step of using a manufacturing point corresponding to the manufacturing condition of the prediction target, as a reference, wherein, when the prediction model constructing step establishes the relationship between a manufacturing condition and a manufacturing result on the basis of the manufacturing conditions and the result information of the operational result database, the prediction model constructing step comprises:

a step of using the similarity as a weight of an evaluation function for evaluating a modeling error of the result information, and a step of using a physical characteristic of the prediction target as a constraint condition to thereby solve a mathematical programming problem concerning the evaluation function within the constraint condition.

The prediction model constructing method according to the present invention preferably further includes a result prediction step. The result prediction step includes prediction model acquiring step of acquiring prediction model corresponding to the manufacturing conditions of the prediction target; and result prediction step of predicting a result corresponding to the manufacturing conditions by inputting the manufacturing condition of the prediction target into the prediction model.

The prediction model constructing method according to the present invention preferably further includes a control step of controlling the manufacturing conditions. The control step includes prediction model acquiring step of acquiring prediction model corresponding to the manufacturing conditions of the prediction target; and control step of performing control by calculating, using the prediction model, an control input such that a controlled variable attains a target value with respect to the manufacturing condition of the prediction target.

The prediction model constructing method according to the present invention preferably further includes a quality design step. The quality design step includes prediction model acquiring step of acquiring prediction model corresponding to the manufacturing condition of the prediction target; and quality design support step of supporting the quality design of a product by outputting at least one output out of the output of a predicted result obtained by inputting at least more manufacturing conditions into the prediction model, and the output of a secondary evaluation index calculated based on the predicted result.

Moreover, the present invention provides a manufacturing method for a product manufactured by any of above-described methods.

In the prediction model constructing apparatus, the manufacturing conditions related to result values of crop length include:
forming amount;
thickness, width, and length of a slab;
thickness, width, and length of a rolling material;
crown amount corresponding to each rolling thickness and rolling width;
cross rolling ratio;
reduction ratio; and
plate thickness correction amount In the prediction model constructing apparatus, the model parameters related to predicted values of crop length include:
forming amount;
thickness, width, and length of a slab;
thickness, width, and length of a rolling material;
thickness and length of a crown;
cross rolling ratio;
reduction ratio; and
plate thickness correction amount In the prediction model constructing method, when predicting Charpy absorbed energy vE of a thick plate from a material prediction model, what are subjected to a constraint condition are as follows:
plate thickness;
slab thickness;
temperature of slab extracted from a heating furnace;
controlled rolling temperature;
rolling finishing temperature;
water-cooling starting temperature;
water-cooling finishing temperature;
cooling water temperature,
water-cooling conveying speed;
water-cooling time ratio;
concentration of each chemical component: C, Si, Mn, P, S, Cu, Ni, Cr, Mo, Nb, V, Ti, Al, B, $N_2$;
temperature of chemical component $H_2$;
temperature of a material test specimen.

In the prediction model constructing method, targets to be predicted include:

Charpy absorbed energy, tensile characteristic, yield stress (YS), yield rate (YR), and elongation capacity (EL) of a thick plate.

In the prediction model constructing method, the constraint conditions for determining constraints to a thick plate correction amount include roll rotation number, roll diameter, the maximum reduction speed of a roll, and constraint conditions for operating these parameters.

EMBODIMENTS FOR CARRYING OUT THE INVENTION

The prediction model constructing apparatus according to the present invention includes: a operational result database that relates manufacturing conditions of a product manufactured in the past to result information on the manufacturing, and that stores a plurality pieces of information obtained by relating the manufacturing conditions to the result information; similarity calculating means for calculating a similarity composed of a plurality of comparison results by comparing the manufacturing conditions stored in the operational result database with a manufacturing condition of a prediction target; and prediction model constructing means for obtaining the prediction model, wherein, when creating a prediction model expressing the relationship between the manufacturing condition and a manufacturing result in the neighborhood of a manufacturing condition of the prediction target, the prediction model constructing means uses the similarity as a weight of an evaluation function for estimating a modeling error, and employing a physical characteristic of the prediction target as a constriction condition, calculates a parameter such that the value of evaluation function becomes a minimum within the constriction condition, to thereby obtain the prediction model. The present invention has solved the above-described problem by causing a computer to execute a program for realizing each of the above-described means.

Figure 4:
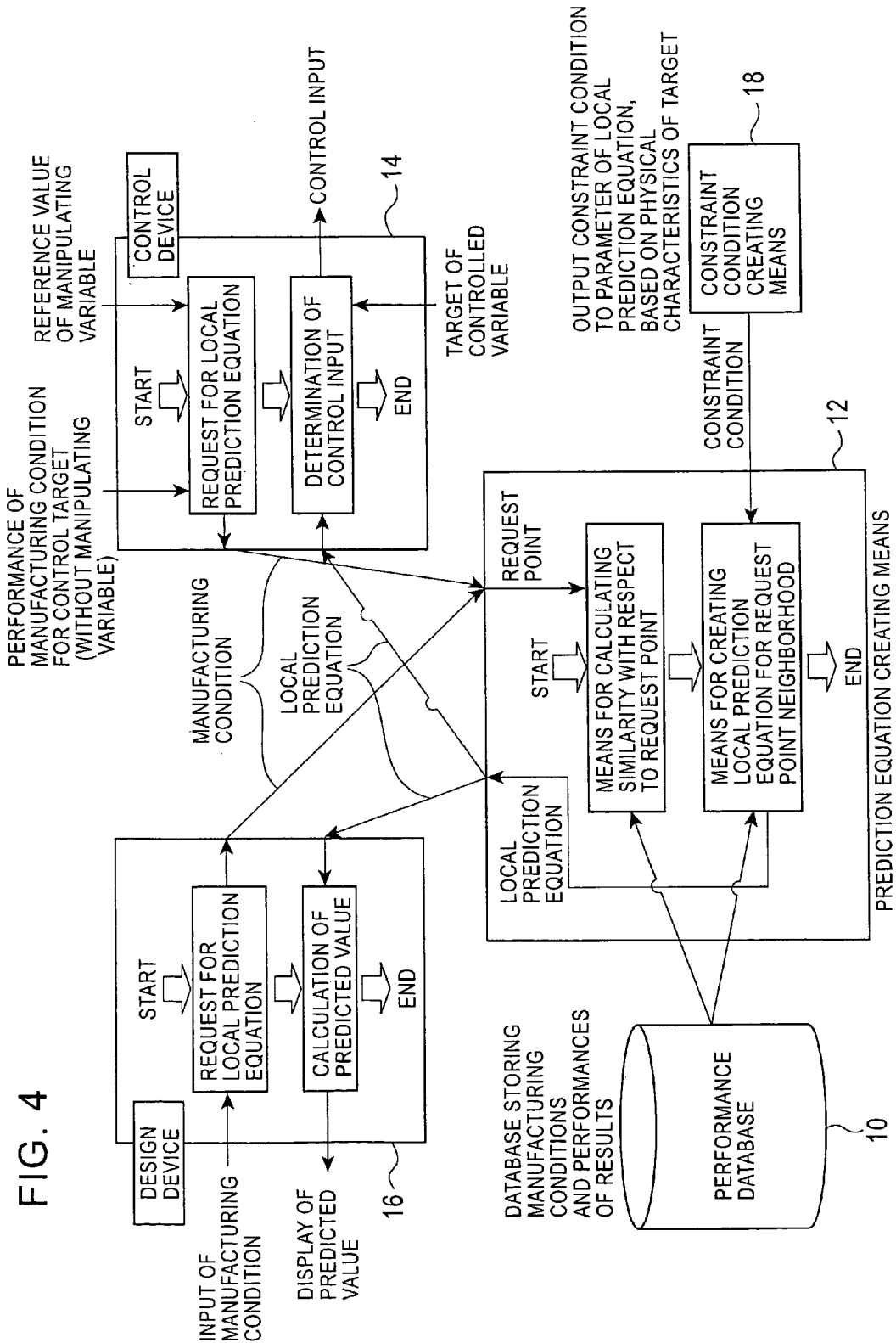
FIG. 4 is a flowchart showing means for controlling and a procedure of quality design, according to the present invention.

Furthermore, the present invention provides a control device 14 characterized by controlling a target in accordance with a predicted result, using the above-described prediction model constructing apparatus (refer to FIG. 4).

Moreover, the present invention provides a design device 16 characterized by designing a manufacturing condition of a target in accordance with a predicted result, using the above-described prediction model constructing apparatus (refer to FIG. 4).

Because the prediction models obtained by the present invention guarantee physical characteristics of a target, they have improved prediction accuracy even in the extrapolation region. Here, "physical characteristics of a target" refers to characteristics derived from physical phenomena, such as qualitative characteristics concerning metallurgical phenomena (more addition of a chemical component C increases the strength of a product, but reduces the toughness thereof; reducing the finishing temperature at rolling increases the strength of a product; and the like) or qualitative characteristics concerning plastic working phenomena (reducing a roll gap decreases the thickness of a product; increasing the difference between inlet thickness and outlet thickness increases load imposed on the rolling mill, and the like).

The conventional method is disadvantageous in that, when neighborhood data becomes fewer, the prediction accuracy thereof rapidly deteriorates. In contrast, in the method according to the present invention, the prediction accuracy thereof does not deteriorate even when neighborhood data becomes fewer, thereby providing stably good prediction accuracy.

Furthermore, performing control using the prediction models according to the present invention prevents manipulations from being performed in wrong directions, that is, prevents manipulations against the physical characteristics from being performed, thereby improving control accuracy.

Also, performing quality design using this prediction model allows reduction in the number of experiments because of an achievement of improved prediction accuracy. This makes it possible to cut down a development cost, and to reduce chance loss accompanying experiments, resulting in a reduced manufacturing cost.

Hereinafter, embodiments according to the present invention will be described with reference to the drawings.

On investigation of the problem regarding the conventional art, it has been found that, because there is no guarantee to satisfy physical characteristics of a target when creating prediction models, the prediction models may become equations that do not conform with physical phenomena, and that, particularly in the extrapolation region, which has no result data in the neighborhood, since such a thing occurs in many cases, the prediction models falls outside physical phenomena.

In a prediction model such that has been proposed by the Patent Document 3, wherein (1) the prediction model defines a distance function, calculates a similarity between each observed data in the operational result database 10 and a query, and (2) creates a prediction model for the query neighborhood by weighted regression weighted with the similarity, a model parameter of the prediction model in (2) has conventionally been determined so that the weighted squared-sum of a modeling error becomes minimum. On the other hand, in the present invention, as shown in FIG. 3, a physical characteristic (e.g., a qualitative characteristic concerning metallurgy phenomenon) of a target is used as constraint condition, and thereupon, the model parameter is determined by solving secondary programming, which is a kind of mathematical programming.

Specific calculation method using a computer is described below.

(1) A distance function is defined, and the similarity between each observed data in the operational result database and a query is calculated.

Figure 1:
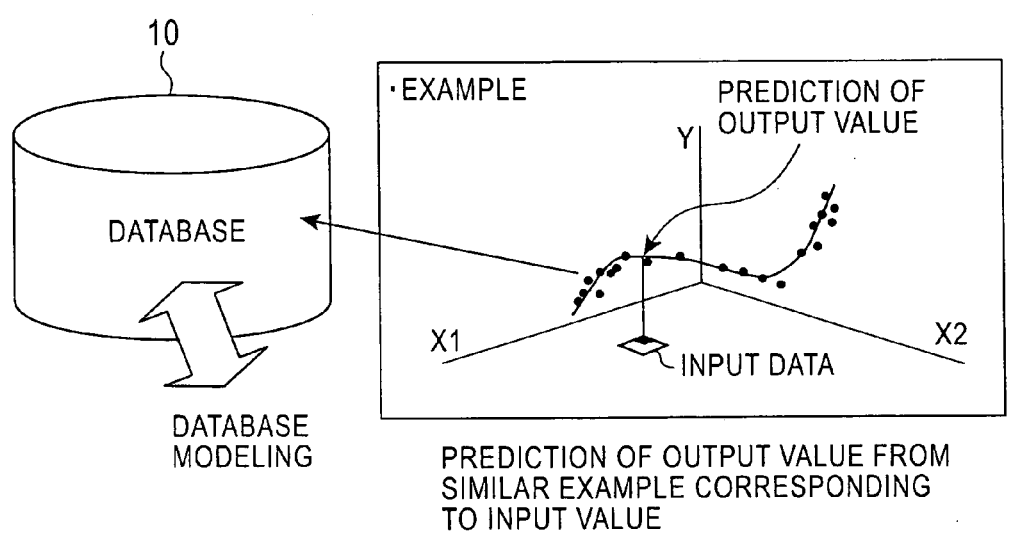
FIG. 1 is a diagram showing a concept of a database type estimation model.
Figure 2:
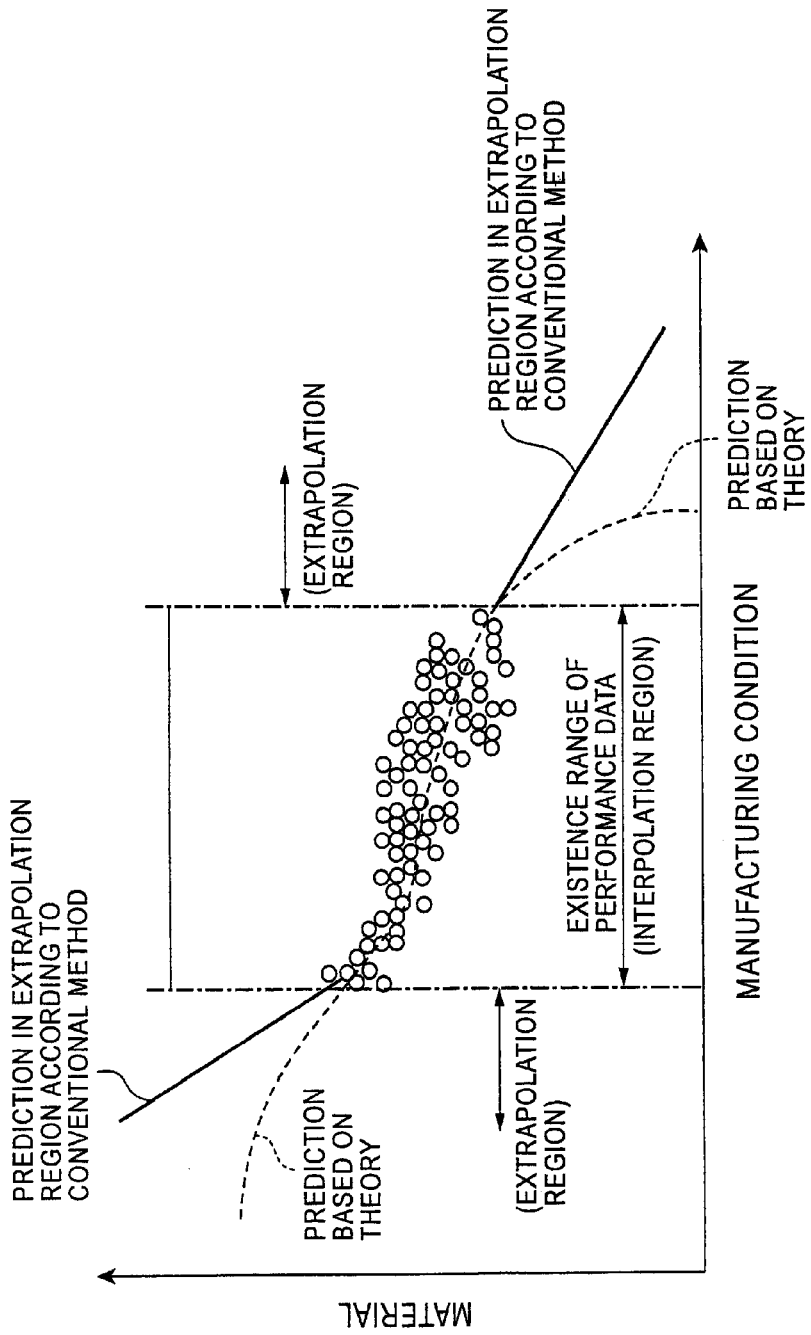
FIG. 2 is a diagram showing prediction accuracy according to a conventional method.
Figure 3:
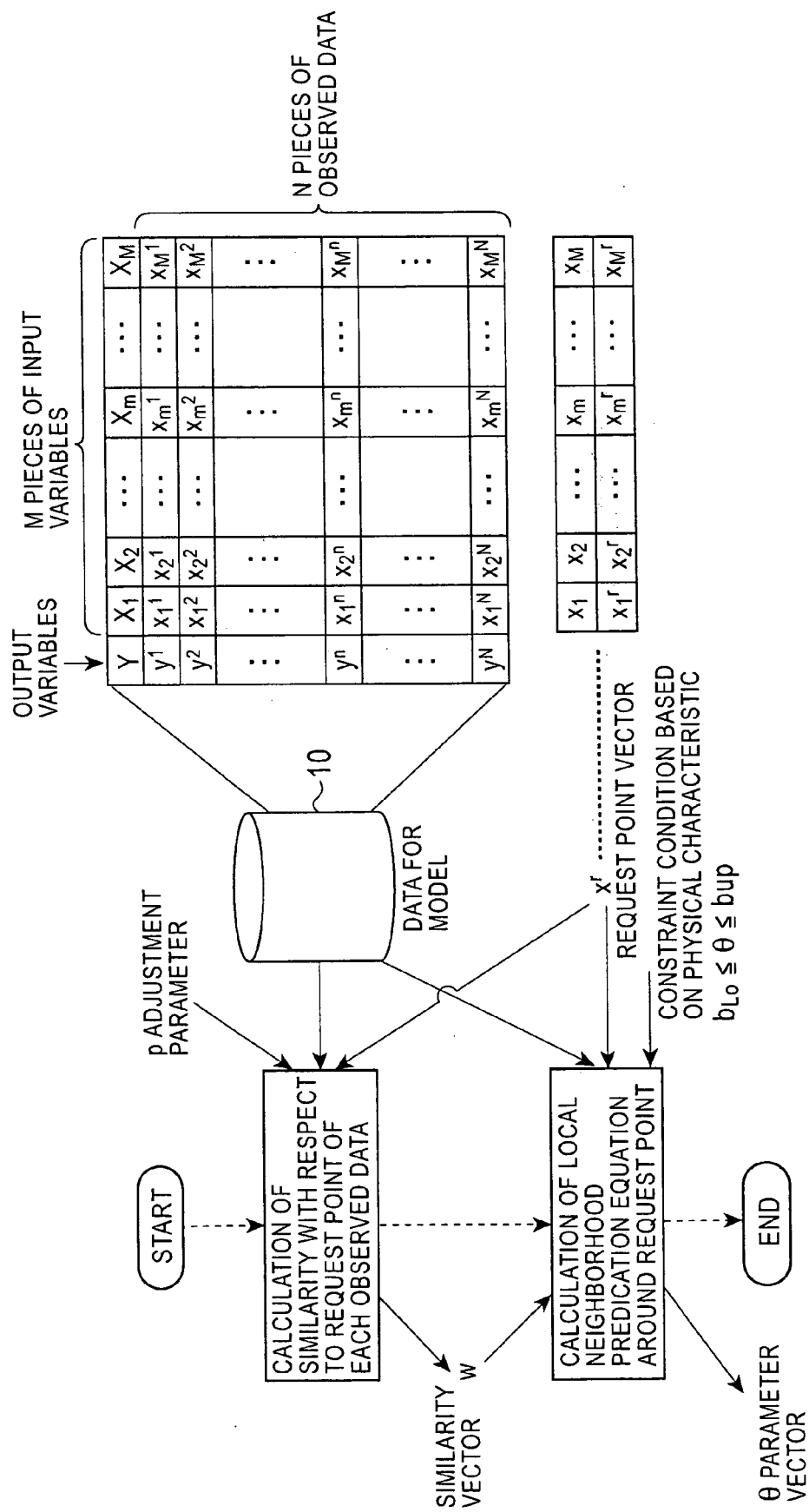
FIG. 3 is a flowchart showing procedure of local regressing according to the present invention.

It is assumed that, in advance, in the operational result database in FIG. 3, criterion variables (output variables, i.e., results of manufacturing) and their predictor variables (input variables, i.e., manufacturing conditions) have been determined, and that observed data thereof have been given. Let the item name of an output variable be Y, and let the item name of m pieces of input variables be $X_m$ (m=1, 2, ..., M). It is also assumed that the number of observed data is N, and that the value of an n-th (n=1, 2, ..., N) output variable is $y^n$ while the value of an n-th input variable is $x_m^n$. An input vector of which the output should be predicted is referred to as a query. The query is represented by the following expression.

$$x^r = [x_1^r, x_2^r, \ldots, x_M^r]^T \quad (1)$$

Using the given N pieces of observed data, a regression equation is created. The regression equation is assumed to be a linear equation as follows:

$$Y = b + a_1 \cdot X_1 + a_2 \cdot X_2 + \ldots a_m \cdot X_M \quad (2)$$

The above-described model parameters, b, $a_1, a_2, \ldots, a_M$ are determined by the least square method.

A partial regression coefficient vector:

$$\alpha = [a_1, a_2, \ldots, a_M]^T \tag{3}$$

is used for a distance function that is described below. A point x in an input space is given by $$x = [x_1, x_2, \ldots, x_M]^T \tag{4}$$

The distance L from the query $x^r$ at the point x is defined as follows:

$$L(x, x^r, \alpha) = \sum_{m=1}^{M} |a_m| \cdot |x_m - x_m^r| \tag{5}$$

This is the distance function.

The partial regression coefficient can be considered to be a degree of contribution of each input variable to variation of an output variable. The distance L is a weighted distance taking the degree of contribution into consideration.

Next, regarding each of the N pieces of observed data, the distance from a query is sought. The distance of the n-th (n=1, 2, ..., N) observed data from the query can be determined by the following expression.

$$L^n = L(x^n, x^r, \alpha) \tag{6}$$

Here, $$x^n = [x_1^n, x_2^n, \ldots, x_M^n]^T, n=1, 2, \ldots, N \tag{7}$$

Also, the distances of 1st to the n-th observed data from the query are collectively expressed as follows:

$$l = [L^1, L^2, \ldots, L^N]^T \tag{8}$$

Next, similarity W representing the closeness of the observed data to the query is defined as following:

$$W(L, p, l) = \exp\{-\{L/(p \cdot \pi(l)^2)\} \tag{9}$$

Here, σ(l) denotes a standard deviation of l, and p is an adjustment parameter (initial value: 1.5).

When the distance L is 0, i.e., the manufacturing condition is exactly the same as the query, the similarity is defined to be 1. On the other hand, when the similarity decreases as the distance increases, and the distance becomes an infinite distance, the similarity is defined to be 0.

Then, regarding each of the N pieces of observed data, the similarity with respect to the query is determined. The similarity between the n-th (n=1, 2, ..., N) observed data and the query can be obtained from the following equation.

$$W^n = W(L^n, p, L), (n=1, 2, \ldots, N) \tag{10}$$

Also, the similarity between the 1st to n-th observed data and the query are collectively expressed as follows:

$$w = [W^1, W^2, \ldots, W^N]^T \tag{11}$$

The term "similarity" refers to an index for estimating the proximity of a query in a manufacturing condition (input variable) to each observed data.

Here, upon defining a distance, the distance between the query and each of the observed data is calculated, and on the basis of this distance between the query and each of the observed data, the similarity is calculated. Herein, as a distance function, a weighted primary norm (sum of absolute values) taking the influence of each manufacturing condition on its result into consideration, is employed, but an Euclidean distance, a normalized Euclidean distance, a Mahalanobis distance, or the like may also be used. Also, here, as a function for converting distance into similarity, Gauss function is used, but a continuous function, such as Tri-cube function, monotonously changing with respect to various distances, may be employed. Furthermore, as set forth in Japanese Unexamined Patent Application Publication No. 6-95880, the value of each input variable in a condition part is discretized into sections, and the discretized distance may be used as a similarity.

(2) By a weighted regression weighted with the similarity, a prediction model for query neighborhood is created.

Using the given N pieces of observed data and respective similarities w, a prediction model is created. The prediction model is assumed to be a linear expression as follows:

$$Y = b + a_1 \cdot X_1 + a_2 \cdot X_2 + \ldots a_m \cdot X_M \tag{12}$$

The model parameter of the prediction model:

$$\theta = [b, a_1, a_2, \ldots, a_M]^T \tag{13}$$

is determined using a mathematical programming method described below.

A modeling error of each of the observed data is expressed by e. The term "modeling error" refers to the difference between a predicted value Ωθ of an output and a performance value y of an output, each of which has been calculated by substituting a performance value of an input of each of the observed data into a prediction model having the model parameter θ, and is defined by the following expression.

$$e = y - \Omega\theta \tag{14}$$

Here, $$y = [y^1, y^2, \ldots, y^N]^T \tag{15}$$

$$\Omega = \begin{bmatrix} 1 & x_1^1 & x_2^1 & \ldots & x_M^1 \\ 1 & x_1^2 & x_2^2 & \ldots & x_M^2 \\ \vdots & \vdots & \vdots & & \vdots \\ 1 & x_1^N & x_2^N & \ldots & x_M^N \end{bmatrix} \tag{16}$$

The model parameter θ is determined by being formulated into an optimization problem, with the weighted squared-sum of the modeling error as an evaluation function, and with the physical characteristics of a target as constraint conditions.

The evaluation function J for the optimization problem is defined as $$J = e^T \Lambda e \tag{17}$$

Substitution of the equation (14) into the equation (17) gives $$J = [y - \Omega\theta]^T \Lambda [y - \Omega\theta] \tag{18}$$

where, Λ is a diagonal matrix of the similarity was follows:

$$\Lambda = \text{diag}(w) = \begin{bmatrix} W^1 & 0 & & 0 \\ 0 & W^2 & & 0 \\ & & \ddots & \\ 0 & 0 & & W^N \end{bmatrix} \tag{19}$$

As constraint conditions for the optimization problem, the physical characteristics of the target concerning the model parameters are used as upper and lower limit values as follows:

$$b^{LO} \leq \theta \leq b^{UP} \tag{20}$$

Here, the physical characteristics are given by $$b^{LO} = [b1^{LO}, b2^{LO}, \ldots, bM^{LO}]^T \quad (21)$$

$$b^{up} = [b1^{up}, b2^{up}, bm^{up}]^T \quad (22)$$

These values are input values.

The decision variable for the optimization problem is the model parameter $\theta$.

Since the model parameter $\theta$ could be formulated into an optimization problem, with the equation (18) as an evaluation function, and with the equation (20) as constraint conditions, the model parameter $\theta$ is calculated using an optimization technique. In the above-described example, the formularization for the purpose of minimizing the evaluation function has been performed, with the weighted squared-sum of the modeling error as an evaluation function, and with the upper and lower limit values of the model parameter $\theta$ as constraint conditions. Because this problem is a secondary programming problem, the model parameter $\theta$ can be determined by using a secondary programming method. However, methods for formularizing into an optimization problem and optimization methods (calculation method for decision variable) are not limited to the foregoing. For evaluation function, not only the weighted squared-sum of the modeling error, but also other calculation formulae such as a sum of absolute values may also be used. For constraint conditions, the present invention is not limited to the upper and lower limit values of the model parameter $\theta$, but is applicable to any mathematical expressions such as equalities or inequalities as long as representing physical characteristics. The present invention can be applied not only for the use of the secondary programming method, but also the use of other mathematical programming methods (linear programming, convex programming, and non-linear programming), or optimization method such as genetic algorithm, simulated annealing.

The use of the present invention allows an achievement of a prediction model that satisfies physical characteristics and that is most significant in modeling error reduction in the satisfaction of physical characteristics.

In the present invention, under the condition that one of a plurality of manufacturing conditions is made a manipulating variable, and values of manufacturing conditions other than the manipulating variable are given, when attempting to determine the value of a manipulating variable for controlling a result of a target to become a target value, as detailed in FIG. 4, (i) target value of controlled variable, a reference value of manipulating variable, and manufacturing condition performance values other than the manipulating variable is provided to the control device from the outside; (ii) the reference value of manipulating variable, and the manufacturing condition performance values other than the manipulating variable are provided to prediction model constructing means as querys; (iii) on the basis of the values of the querys and constraint conditions regarding the model parameters based on physical characteristics of a target inputted from the outside, the model parameter of the prediction model at the query is determined based on the flow shown in FIG. 3, and it is returned to the control device; (iV) on the basis of the model parameter of the prediction model, the target value of controlled variable and the manufacturing condition performance values other than the manipulating variable, the value of the manipulating variable for making a result the target value of controlled variable is determined.

Specifically, calculations in (iv) are performed as follows.

In the equation (12), X1 is assumed to be a manipulating variable. Solving the equation (12) for X1 gives $$X_1 = 1/a_1 \times \{Y - (b + a_2 \cdot X_2 + \ldots + a_M \cdot X_M)\} \quad (23)$$

By substituting the target value of controlled variable into Y on the right side of this equation, and substituting the model parameter of the prediction model into [b, $a_1$, $a_2$, $a_M$], and substituting the of manufacturing condition performance values other than the manipulating variable, the value $X_1$ of the manipulating variable for making a result the target value of controlled variable can be obtained. Letting the reference value of the manipulating variable be $X_1^0$, the equation (23) can be deformed as follows:

$$X_1 - X_1^0 = 1/a_1 \times \{Y - (b + a_1 \cdot X_1^0 + a_2 \cdot X_2 + \ldots + a_M \cdot X_M)\} \quad (24)$$

Here, $(b + a_1 \cdot X_1^0 + a_2 \cdot X_2 + \ldots + a_M \cdot X_M)$ is the value of a result when the control input is made the reference value, and hence, $\{Y - (b + a_1 \cdot X_1^0 + a_2 \cdot X_2 + \ldots + a_M \cdot X_M)\}$ becomes a deviation of the result from the target value. Since $(X_1 - X_1^0)$ is a variation of the manipulating variable from the reference value for making the result a target value, the value of the coefficient $1/a_1$ for determining this $(X_1 - X_1^0)$ is important for accurately determining the manipulating variable for making the result a target value, that is, important for accurately controlling the result to become the target value. In the present invention, since $a_1$ is determined so as to satisfy physical characteristics, the variation of the manipulating variable is also calculated so as to satisfy physical characteristics. In particular, performance data does not exist in the neighborhood of a query, thereby improving the calculation accuracy of the variation of the manipulating variable in the extrapolation region in which the calculation accuracy of the model parameter is low.

Next, when supporting the design of quality, a designer inputs manufacturing conditions, and a designer causes a computer to calculate predicted values of the quality corresponding to the manufacturing condition, and to display it. Based on the display results, the designer performs repeatedly changing inputs of the manufacturing conditions, to thereby seek for manufacturing conditions such that the quality becomes a predetermined value. When the present invention is applied to this operation, as shown in FIG. 4, (i) values of the manufacturing conditions are inputted into the design device; (ii) values of the manufacturing conditions are provided to prediction model constructing apparatus, as querys; (iii) on the basis of the values of the querys and constraint conditions regarding the model parameters by physical characteristics of a target inputted from the outside, the model parameter of the prediction model at the query is determined based on the flow shown in FIG. 3, and it is returned to the control device; (iV) on the basis of the model parameter of the prediction model and values of the manufacturing conditions, the predicted value of a result is calculated using the equation (12), and further, after secondary estimation indices have been calculated, they are outputted to thereby be displayed to the designer. Here, the term "secondary estimation indices" refer to results other than quality, for example, manufacturing cost, inferior quality incidence rate, production efficiency, lead time, risk, etc.

In FIG. 4, the prediction model constructing means, control device, design device, operational result database, constraint condition creating means are each constituted of a computer. These devices each comprise a calculation processing part (composed of a CPU, a RAM and a ROM for operation), a storage part for storing various programs and various data, (e.g., a hard disk drive (HDD)), an operation part for inputting operation instructions from a user (e.g., a keyboard and a mouse), a display part for displaying information such as images and/or characters (e.g., a liquid display), and a communication part for controlling communications between devices via a network (a local area network (LAN), or a wide area network (WAN), Intranet, or the like. These means and devices perform respective functions by the CPU in the calculation processing part executing various programs. These means and devices may be configured to be connected to each other via a network, as computers each serving as independent hardware, or alternatively, a plurality of these means and devices May exist in a single computer, as respective functions. Information transmissions between computers are performed not only via a network, but also may be performed via a storage medium (a USB memory, CD-ROM, floppy disk, or the like).

Embodiment 1

Embodiment 1 is an example of prediction model constructing means for Charpy absorbed energy of a kind of quality characteristic value of a kind of material, in a kind of thick plate of a steel product. Hereinafter, it will be shown that a method according to the present invention has an improved prediction accuracy as compared with the conventional method.

The observed data stored in the operational result database are 1032 in number. Out of them, output variables are constituted of Charpy absorbed energies, and input variables are 27 in number, except for a constant term as shown in an item in Table 1.

Figure 5:
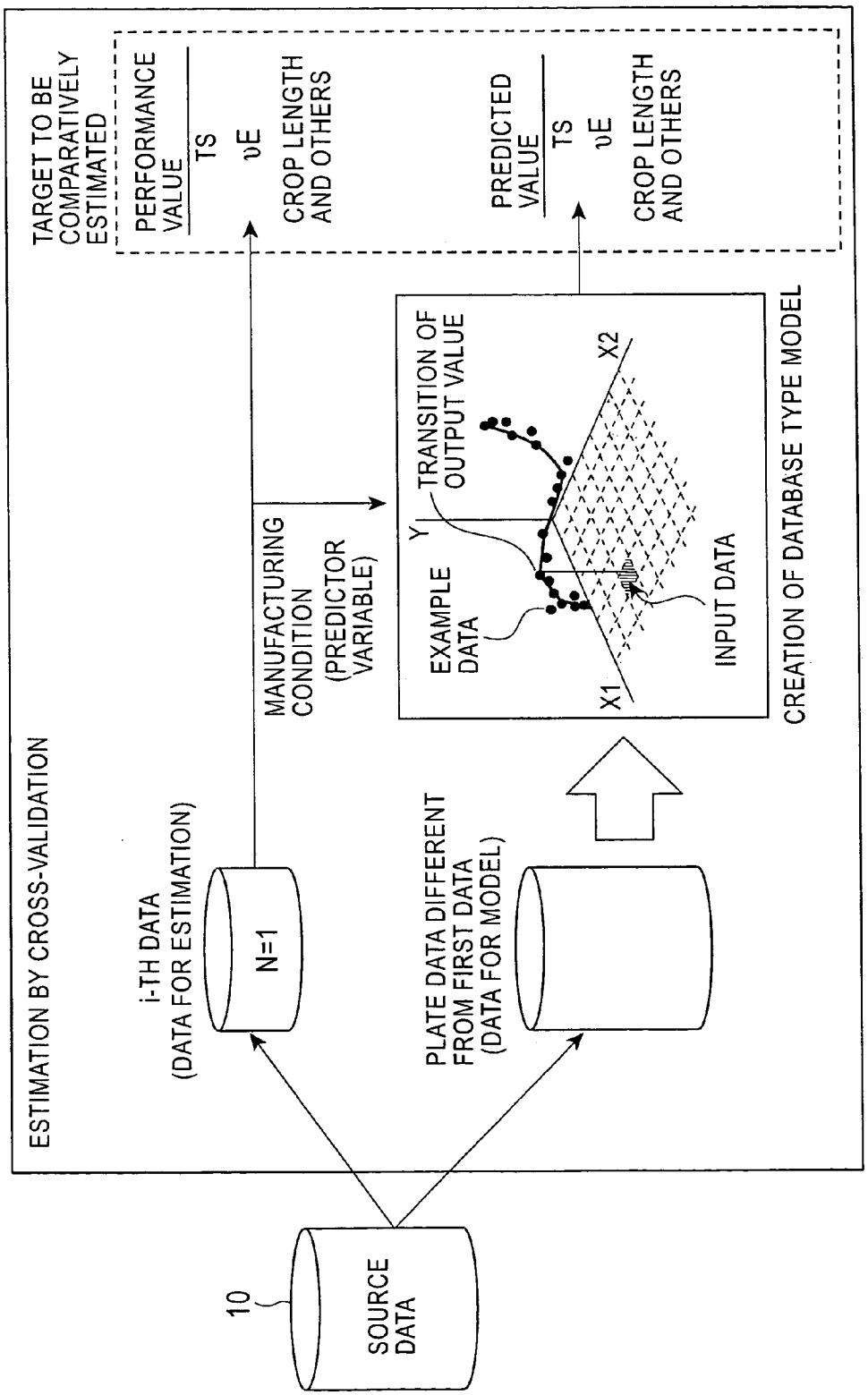
FIG. 5 is a schematic view showing a way of evaluation.

In order to estimate the prediction accuracy, the cross-validation method is used as shown in FIG. 5. A single piece of data is optionally extracted from the operational result database as data for estimation, and a prediction model is created using the other data, as data for model. By substituting the value of the input variable of the data for estimation into the prediction model, a predicted value is calculated. Since the value of an output variable of the data for estimation provides a performance value, the difference between the predicted value and the value of the output variable of data for estimation becomes a prediction error. The forgoing processing is performed with respect to all of 1032 pieces of data, thereby estimating the prediction error in a statistical manner.

When creating the prediction model in the present invention, constraint conditions derived from physical characteristic of a target has been provided to the model parameter with respect to the plate thickness; the controlled rolling temperature; the finish temperature; the water-cooling start temperature; the water-cooing finish temperature; C, Mn, Cu, Ni, Cr, MO, Nb, V; and the test specimen temperature. A constraint condition given to the model parameter of each manufacturing condition is shown in Table 1. The constraint conditions shown in Table. 1 include items of LOW and UP, which shows a lower limit and an upper limit of the constraint, respectively. The symbol "-" means that no constraint is provided. For example, speaking of the pate thickness, 0 is entered into the LOW column and "-" is entered into the UP column. This means that the value of the model parameter corresponding to the plate thickness is 0 in the lower limit, and that the plate thickness is without upper limit. This is a constraint condition derived from target's physical characteristic such that the Charpy absorbed energy arises as the plate thickness increases.

Figure 6A:
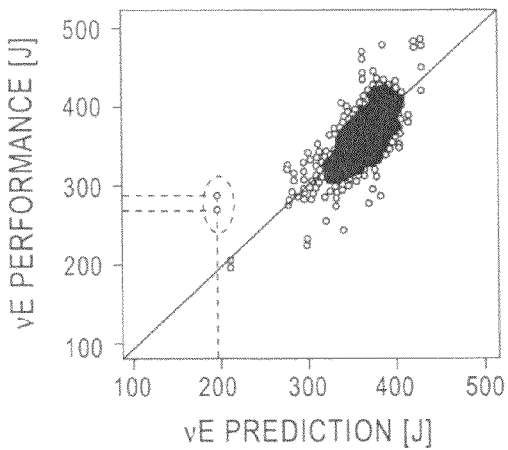
FIGS. 6A to 6C are diagrams each showing a comparison in the prediction error of Charpy absorbed energy between the conventional method and method according to the present invention.
Figure 6B:
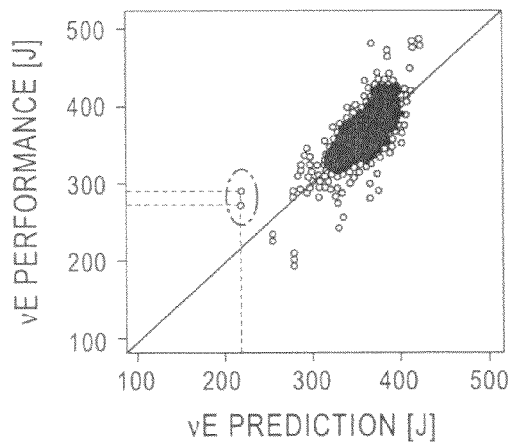
Figure 6C:
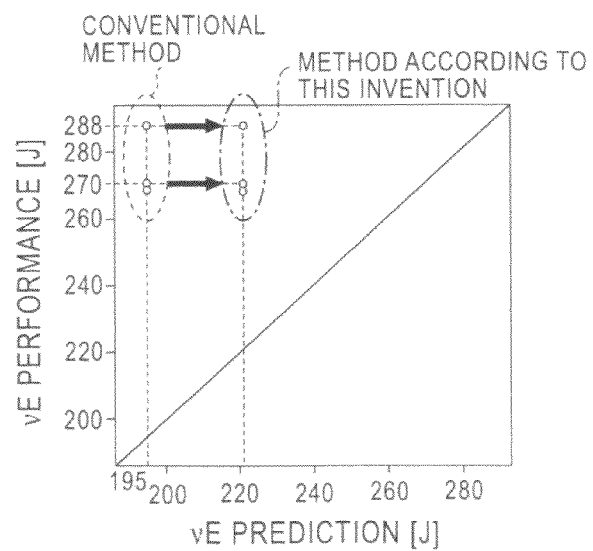

As a result, as shown in FIG. 6, as compared with the conventional method in which a prediction model is determined without providing a constraint condition of physical characteristic of a target, the standard deviation of prediction errors in the extrapolation region has been improvedly reduced by 33% according to the present invention. Also, in the extrapolation region, the difference between prediction error according the method according to the present invention and the prediction error according to the conventional method was calibrated. Consequently, the method according to the present invention showed a significant difference with respect to the conventional method, i.e., showed a significant level of 5% over the conventional method. Thus, the method according to the present invention has a prediction accuracy improving effect as compared with the conventional method.

On the other hand, in the interpolation region, homogeneity of variance of prediction error was calibrated, using the method according to the present invention and the prediction error according to the conventional method. However, no significant difference was observed between them. Therefore, in the prediction accuracy in the interpolation region, the method according to the present invention would not compare unfavorably with the conventional method.

TABLE 1

| | Constraint condition | | Calculation parameter | |
|---|---|---|---|---|
| Item | LOW | UP | Without constraint | With constraint |
| Constant term | — | — | -155.6930 | -1513.3290 |
| Plate thickness | 0 | — | -4.9766 | 0.1037 |
| Slab thickness | — | — | 0.0467 | 0.0584 |
| Temperature of slab extracted from heating furnace | — | 0 | -0.2399 | -0.0682 |
| Controlled rolling temperature | — | 0 | 0.6530 | -0.0216 |
| Rolling finish temperature | — | 0 | -0.0385 | -0.0642 |
| Water-cooling start temperature | — | 0 | 0.3528 | -0.0693 |
| Water-cooling finish temperature | — | 0 | 0.0060 | -0.0313 |
| Cooling water temperature | — | — | -0.8838 | 3.5640 |
| Water-cooling conveying speed | — | — | -1.7421 | -1.7598 |
| Water-cooling time ratio | — | — | -0.5014 | -0.3660 |
| Concentration of chemical component C | — | 0 | -2831.6180 | -4.8566 |
| Concentration of chemical component Si | — | — | 794.8805 | 562.1016 |
| Concentration of chemical component Mn | 0 | — | 245.5972 | 1415.6460 |

TABLE 1-continued

| | | | | |
|---|---|---|---|---|
| Concentration of chemical component P | — | — | -3057.7720 | 3250.5100 |
| Concentration of chemical component S | — | — | -15099.3800 | -21087.1600 |
| Concentration of chemical component Cu | 0 | — | 3003.9480 | 3.6115 |
| Concentration of chemical component Ni | 0 | — | 2194.8510 | 4.2119 |
| Concentration of chemical component Cr | 0 | — | -2037.7000 | 2.7101 |
| Concentration of chemical component Mo | 0 | — | -4648.0370 | 3.6116 |
| Concentration of chemical component Nb | 0 | — | 6933.8280 | 3.5569 |
| Concentration of chemical component V | 0 | — | -11372.6500 | 3.5117 |
| Concentration of chemical component Ti | — | — | 1652.8250 | 1403.6230 |
| Concentration of chemical component Al | — | — | -2868.2160 | -2564.4470 |
| Concentration of chemical component B | — | — | -11585.5800 | -101578.3000 |
| Concentration of chemical component $N_2$ | — | — | 5200.8170 | 28691.6900 |
| Temperature of chemical component $H_2$ | — | — | 96583.0400 | -260852.4000 |
| Temperature of material test specimen | 0 | — | -0.1860 | 0.0079 |

▯ :

Parameter that has fallen outside constraint condition

Embodiment 2

Embodiment 2 is an example of prediction model constructing means for tensile strength of a kind of quality characteristic value of a kind of material, in a kind of thick plate of a steel product. Hereinafter, it will be shown that a method according to the present invention has an improved prediction accuracy as compared with the conventional method.

The observed data stored in the operational result database are 2608 in number. Out of them, output variables are constituted of tensile strengths, and input variables are 26 in number, with the test specimen temperature excluded from the manufacturing conditions in the first embodiment.

In order to estimate the prediction accuracy, the cross-validation method is used as shown in FIG. 5. A single piece of data is optionally extracted from the operational result database as data for estimation. Then, out of the other data, data having a high similarity with respect to the value of manufacturing condition (query) of the data for estimation is eliminated in a descending order, and a prediction model is created using the data cleared of the high-similarity data, as data for model. That is, by eliminating data in the neighborhood of the query, an extrapolation region is created in a pseudo manner. Then, by substituting the value of the input variable of the data for estimation into the prediction model, a predicted value is calculated. Since the value of an output variable of the data for estimation provides a performance value, the difference between the predicted value and the value of the output variable of data for estimation becomes a prediction error. The forgoing processing is performed with respect to all of 2608 pieces of data, thereby estimating the prediction error in a statistical manner.

Figure 7:
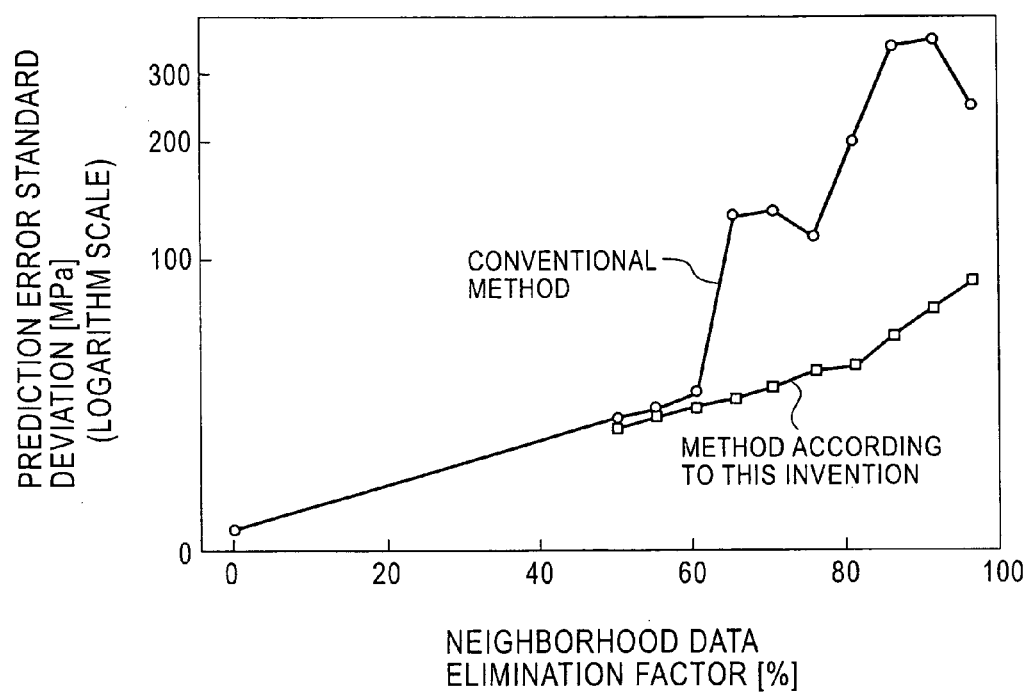
FIG. 7 is a diagram showing a comparison in the prediction error of tensile characteristic between the conventional method and method according to the present invention.

FIG. 7 shows the results. When the neighborhood data elimination factor is 50 to 60%, there is little difference between the method according to the present invention and the conventional method, and the prediction accuracies by both methods are not so bad. However, when the neighborhood data elimination factor exceeds 60%, the conventional method rapidly increases in prediction error. On the other hand, the method according to the present invention does not rapidly deteriorate in prediction accuracy, thus stably providing good prediction accuracy.

By constructing a quality design device using this prediction model constructing means, the designer can obtain a quality predicted value with high accuracy even in the extrapolation region. This reduces the number of experiments, which makes it possible to cut down a development cost, and to reduce chance loss accompanying experiments, resulting in a reduced manufacturing cost.

In the above-described embodiments, the present invention has been limited to the prediction of the Charpy absorbed energy or the tensile strength of a thick plate, but application targets of the present invention are not restricted thereto. For example, the application targets include yield stress (YP), yield ratio (YR), elongation capacity (EL).

Embodiment 3

In planar shape of a thick steel plate after rolling, the method according to the present invention was applied to a model for predicting the crop length of front edge/tail edge part, and the simulation of crop length control.

Figure 8:
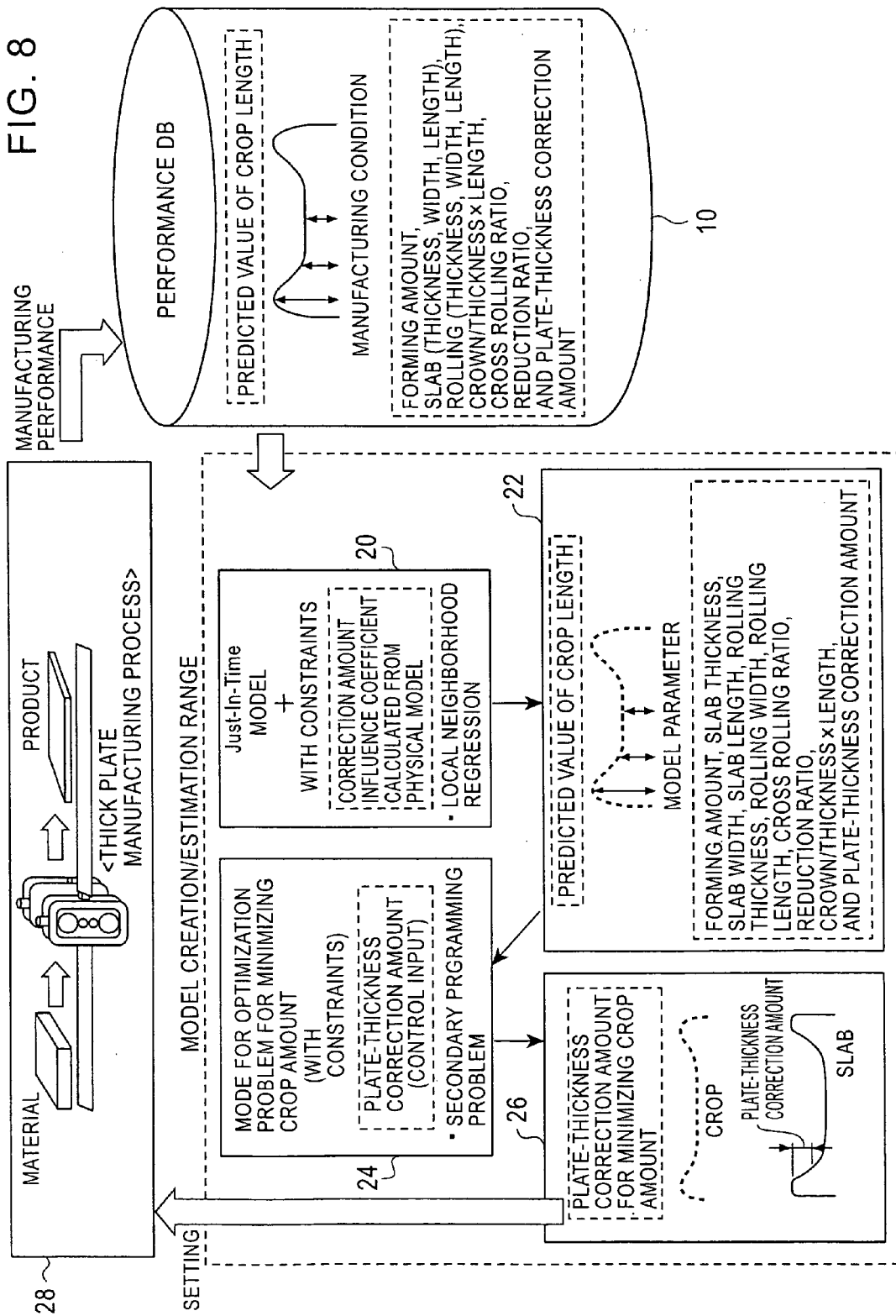
FIG. 8 is a schematic view of the prediction of the control of crop length in Embodiment 3 of the present invention.

FIG. 8 shows an outline of the crop length prediction and the crop length control in this embodiment. (i) First, using the operational result database 10, constraints are added to a just-in-time model (JIT model) in consideration of physical characteristics, and as in the case of the first and second embodiments, a model for crop length is constructed by a local neighborhood regression (model constructing means 20). (ii) Next, from the obtained model, a predicted value of crop length is determined (crop length creating means 22). (iii) From the predicted value of crop length, a plate thickness correction amount such as to reduce the crop length is determined by a secondary programming problem with constraints (optimal controlled variable calculating means 24 and 26). (iV) The obtained plate thickness correction amount is applied to an actual process (manufacturing process 28). (v) The obtained result is stored in the database, and a modification of the model is added. The crop length prediction and the crop length control go through the above-described processes.

1) Crop Length Prediction Model

To the crop length prediction model, the prediction model constructing means according to the present invention was applied.

Here, model constructing means 20 and the crop length creating means 22, which are each a crop length prediction model, will be described in detail.

Figure 9A:
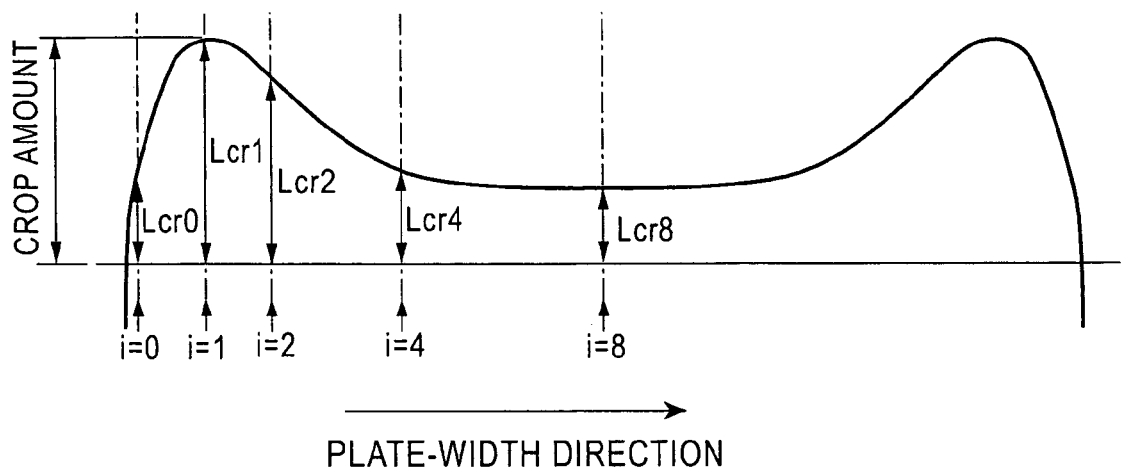
FIGS. 9A and 9B, respectively, are diagrams showing a crop shape and a representative crop length; and a slab shape and plate-thickness correction amounts.

As crop lengths, each of which is criterion variable (output variable, dependent variable) of a local neighborhood regression model, crop lengths Lcr0, Lcr1, Lcr2, Lcr4, and Lcr8 at representative positions out of positions corresponding to dividing points that divide the plate width into 16 equal parts in the plate-width direction, were used, as shown in FIG. 9A.

The predictor variable (input variable, independent variable) of crop length is regarded as a forming amount, a slab shape, a shape after rolling, a plate thickness correction amount or the like, from physical findings, and a prediction model for crop length is expressed as a linear formula as followings:

$$\text{Crop length } Lcr = \\ b + a_1 \times \text{forming amount} + a_2 \times \text{slab thickness} + a_3 \times \text{slab width} + \\ a_4 \times \text{slab length} + a_5 \times \text{rolling thickness} + a_6 \times \text{rolling width} + \\ a_7 \times \text{rolling length} + a_8 \times \text{rolling ratio} + a_9 \times \text{total length} + \\ a_{10} \times (\text{crown/rolling thickness} \times \text{rolling width}) + \\ a_{11} \times dh0 + a_{12} \times dh2 + a_{13} \times dh8$$

(25)

Figure 9B:
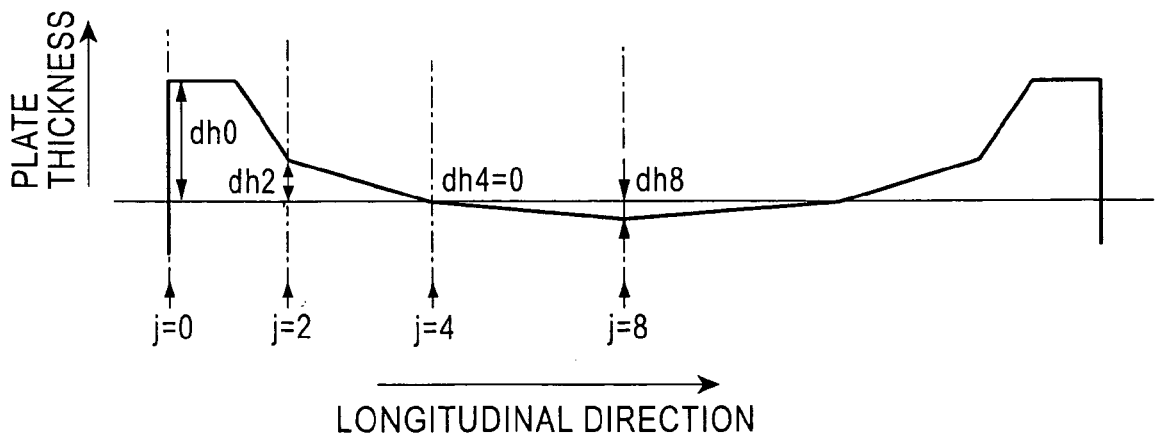

As shown in FIG. 9B, as plate thickness correction amounts dh, plate thickness correction amounts dh0, dh2, and dh8 at representative positions out of positions corresponding to dividing points that divide the plate length into 16 equal parts in the longitudinal direction of rolling, were used. Here, the plate thickness correction amount is a plate thickness difference relative to dh4.

The model parameters $a_{11}$, $a_{12}$, and $a_{13}$ of the local neighborhood regression are each a crop length variation when the thicknesses at the representative positions j=0, 2, and 8 in the longitudinal direction are changed by 1 [mm] that is, they are plate thickness correction amount influence coefficients. These parameters $a_{11}$, $a_{12}$, and $a_{13}$ are each defined at the representative crop lengths Lcr0, Lcr1, Lcr2, Lcr4, and Lcr8.

In this embodiment, as constraint conditions, constraints as shown in the following expressions were given to the plate thickness correction amount influence coefficients $a_{11}$, $a_{12}$, and $a_{13}$ with respect to the plate thickness correction amounts dh0, dh2, and dh8.

$$b_{LO,11} \leq a_{11} \leq b_{UP,11}$$

$$b_{LO,12} \leq a_{12} \leq b_{UP,12}$$

$$b_{LO,13} \leq a_{13} \leq b_{UP,13} \qquad (26)$$

Here, $b_{LO}$ is the lower limit of the plate thickness correction amount influence coefficient, and $b_{UP}$ is the upper limit of the plate thickness correction amount influence coefficient. In this embodiment, as a constraint, a constraint of a plus signs or a minus sign was used. These constricts have been provided based on physical prospective knowledge to the target.

Using performance values such as the forming amount, the slab shape, the shape after rolling, and the plate thickness correction amount, as input values Q, while using the performance values of Lcr0, Lcr1, Lcr2, Lcr4, and Lcr8, as output values y, the model parameter θ was determined so that the model error (equation (14)) of each of the representative crop lengths becomes a minimum, by the JIT model (method according to the present invention) with restrictions in the same way as Example 1 and Example 2.

Using 692 pieces of performance data except for data with left-right difference of crop being large, data with bending in the longitude being large, data with material thickness being different, and data with the material width being different, as data for simulation, a single piece of performance data are optionally extracted from the database 10, as estimation data and constraint data, and with the other data used as data model construction, all data were subjected to simulation, as shown in FIG. 5.

The accuracy of the model is estimated using these data, by (i) calculating the local regression coefficient θ under constraint condition, (ii) calculating a predicted data of crop length using the equation (4) from a predictor variable such as forming amount, out of the obtained local regression coefficient θ and query data, i.e., data for estimation, and (iii) comparing this predicted data of crop length with performance data of crop length, which is criterion variable out of data for estimation.

As a result, as shown in TABLE 2, a standard deviation σ of predicted values with respect to performance values of crop length are obtained. It can be seen from this table that, in solving a model, compared with "without constraint condition", "with constraint condition" is small in standard deviation σ of error, that is, fits for the performance data.

TABLE 2

| | Position | | | | |
|---|---|---|---|---|---|
| | 0/16 | 1/16 | 2/16 | 4/16 | 8/16 |
| With constraint condition (Method according to this invention) | 51.2 | 44.3 | 46.6 | 52.1 | 63.5 |
| Without constraint condition | 92.5 | 83.8 | 74.6 | 60.7 | 74.3 |

2) Control of Crop Length

Next, the optimal controlled variable calculating mean 24 and 26 described in FIG. 8 will be detailed.

This is application of the control device according to the present invention.

When the parameter θ of the model has been determined as described above, the plate thickness correction amount as a control input for controlling the crop length as a controlled variable to become a minimum, is determined.

Here, relative to the crop length $Lcr_4$, crop length evaluation function Φ is assumed as follows:

$$\Phi = \\ (Lcr_0 - Lcr_4)^2 + (Lcr_1 - Lcr_4)^2 + (Lcr_2 - Lcr_4)^2 + (Lcr_8 - Lcr_4)^2 \qquad (27)$$

The crop lengths Lcr0, Lcr1, Lcr2, Lcr4, and Lcr8 can be expressed by linear connection among the forming amount, slab shape, shape after rolling, and plate thickness correction amount dh (equation (25), each using a model parameter θ as a coefficient, and these crop lengths will determine plate thickness correction amount dh0, dh2, and dh8 so as to minimize the crop length evaluation function Φ (equation (27)).

Also, as constraint conditions, constraints of physical characteristics such as the roll rotating number, the roll diameter, and the maximum reduction rate of roll, or operational constraints are required.

For example, constraints of reduction speed includes the following relationships:

$$-\Delta_1 \leq dh0-dh2 \leq \Delta_1$$

$$-\Delta_2 \leq dh2 \leq \Delta_2$$

$$-\Delta_3 \leq dh8 \leq \Delta_3$$

On the other hand, operational constraints includes the following relationships:

$$0 \leq dh0-dh2$$

$$0 \leq dh2$$

$$0 \leq dh2-dh8$$

where, $\Delta_1$, $\Delta_2$, and $\Delta_3$ are constrains determined from the maximum control input.

As described above, by solving a constrained secondary programming problem using the crop length evaluation function Φ serving as a criterion function, the optimal plate thickness correction amount, that is, a plate thickness correction amount after manipulation is calculated.

In simulations, the same 692 pieces of performance data as those used in the simulation of the above-described crop length prediction model. For the calculation of the plate thickness correction amount after manipulation, a single piece of data for estimation optionally extracted from the database 10, and correspondingly, influence coefficients $a_{11}$, $a_{12}$, and $a_{13}$ given for each data for estimation in the simulation of the above crop length prediction model, as well as predicted values of crop lengths $Lcr_0$, $Lcr_1$, $Lcr_2$, $Lcr_4$, $Lcr_8$ were used. Also, regarding constraint conditions, maximum control variables are determined from the roll rotating number, the roll diameter, and the maximum reduction rate of roll, and a changing section length of the plate thickness correction amount, for each data for estimation, and the maximum control variables are taken as constraint condition. From these data, optimization problems with constraints were solved for each data for estimation, and after the plate thickness correction amounts after operations have been determined, they were compared with plate thickness performance value.

Figure 10A:
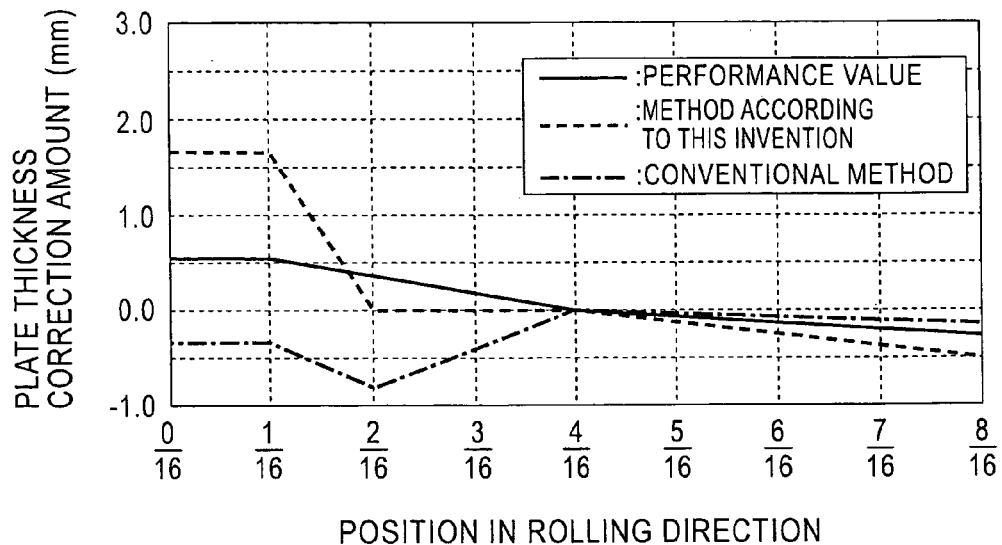
FIGS. 10A and 10B are diagrams each showing a comparison in the plate-thickness correction amount among the result value, the value obtained by the conventional method, and that obtained by the method according to the present invention.
Figure 10B:
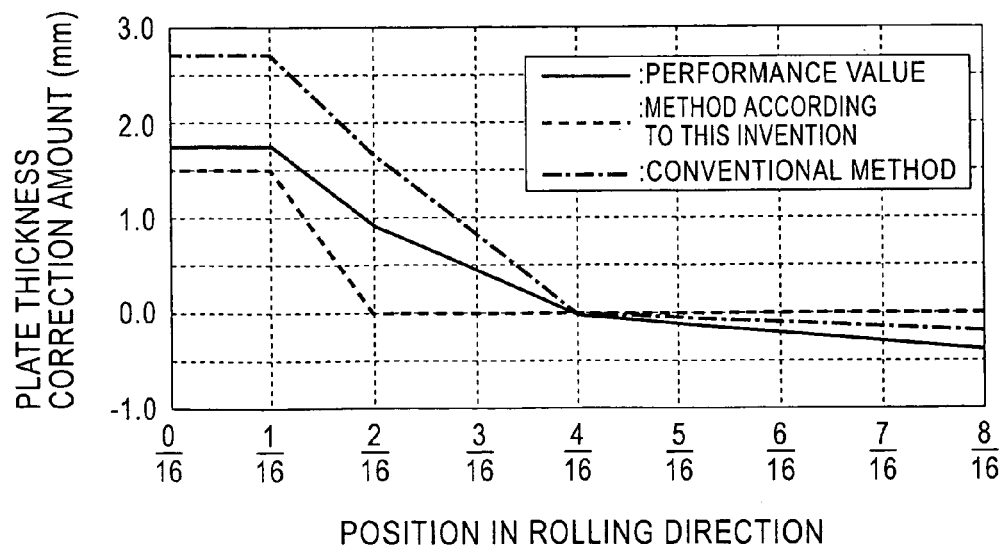

FIGS. 10A and 10B show examples in which, regarding performance data in the extrapolation region, control inputs (plate thickness correction amount) are deficient and excessive out of cases where plate thickness correction amount after operation and performance value of plate thickness correction amount are compared. The horizontal axis designates positions in the rolling direction, corresponding to dividing points that divide the plate length into 16 equal parts in the longitudinal direction, and the vertical axis designates plate thickness correction amounts relative to the plate thickness correction amount dh4. As a result of simulation, plate thickness correction amounts dh by which the crop length evaluation function decreases so as to increase the plate thickness correction amount with respect to the deficiency of plate thickness correction amount, and to reduce the plate thickness correction amount with respect to the excess of plate thickness correction amount, were calculated. Also, it was prevented to operate in a physically wrong direction. On the other hand, according to the conventional method, there are cases where operations are made in a wrong direction. The conventional method, therefore, has not been applicable to actual machines.

Figure 11A:
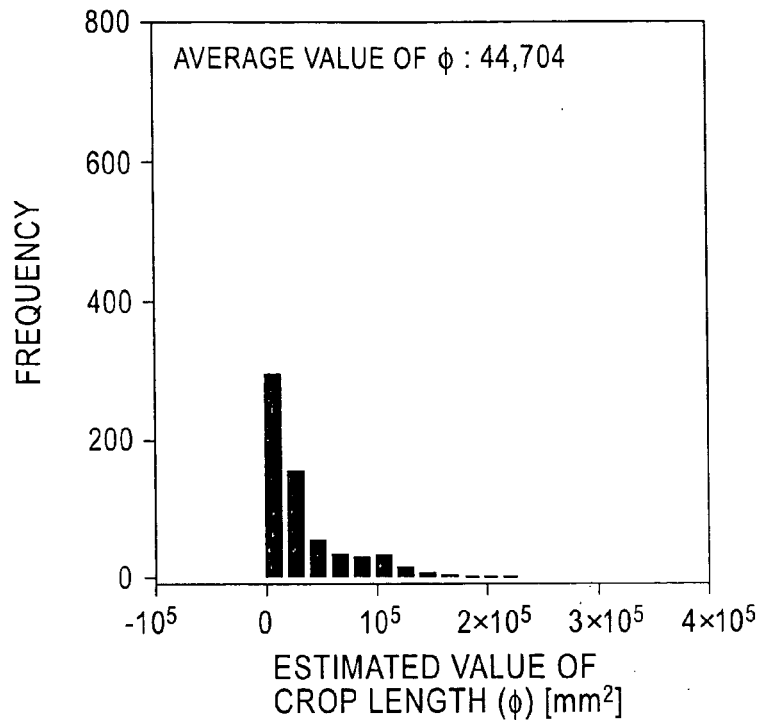
FIGS. 11A and 11B are each a histogram of evaluation value of crop length obtained by the method according to the present invention and the conventional method.
Figure 11B:
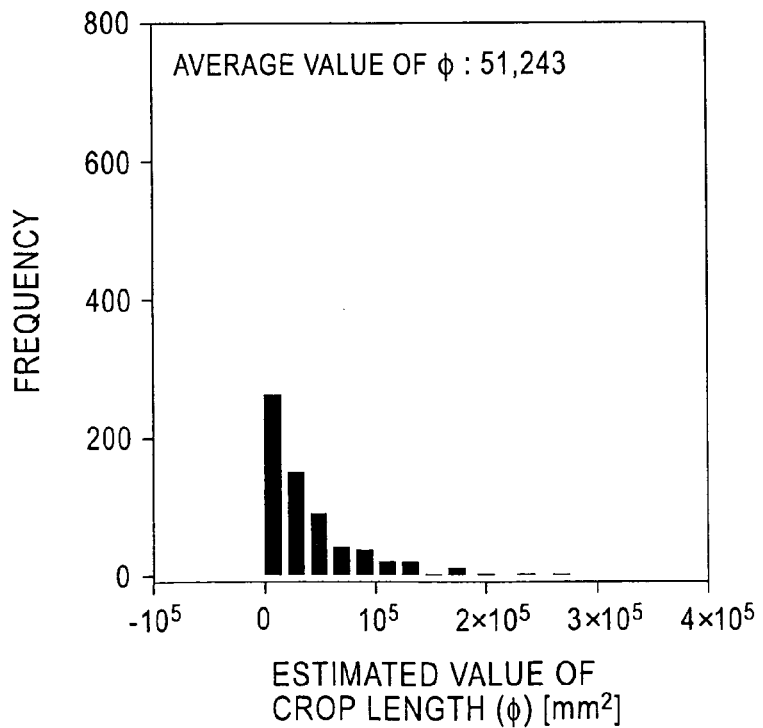

Next, estimations were performed by comparing the plate thickness correction amounts after operation, obtained by optimization with constraints and performance values (confer to FIGS. 11A and 11B).

Embodiment 4

Herein, an example of quality design support means using the present invention is shown.

In the quality design, the determination of manufacturing condition optimizing two or more criterion functions (e.g., manufacturing cost and risk (farness from the past example)) is limited in accuracy, in the current method, because the number of manufacturing conditions is large and targets are nonlinear. Accordingly, in this embodiment, on the basis of the material DB and manufacturing condition unit cost information, risks and physical characteristics that have fallen outside the past manufacturing performance are visualized, thereby facilitating decision-making of a product quality designer.

The quality design must be performed on the basis of the manufacturing performance and cost information in the past. In the current situation, the designer performs decision-making by looking into ledger sheets, but there is no technique for quantitatively estimating risks (falling outside the past manufacturing performance) and costs, and hence, it is impossible to estimate whether designed manufacturing conditions are suitable. With this being the case, in this embodiment, as shown in FIG. 12, on the basis of a quality DB 30 storing values of manufacturing conditions under which a product is manufactured, and quality characteristic value (performance value) at that time, and information on unit costs of the manufacturing conditions, obtained from a cost DB 32 storing costs per unit amount of the manufacturing conditions, two or more criterion functions (closeness to manufacturing conditions and past examples, herein) out of the manufacturing conditions satisfying required specifications, are visualized by a personal computer 40 and displayed on support screen 50, thereby facilitating decision-making.

Figure 12:
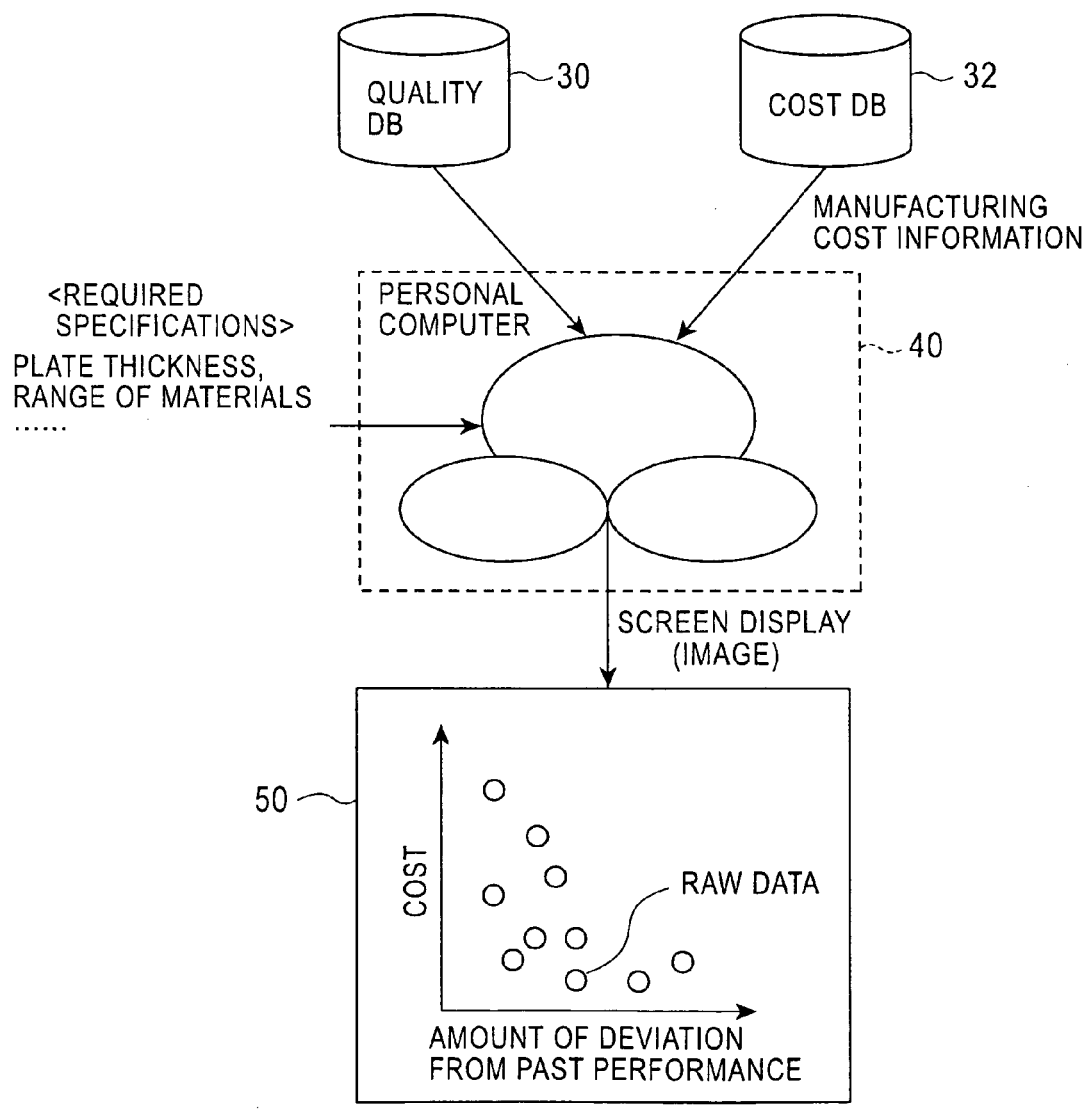
FIG. 12 is a block diagram showing a basic construction of Embodiment 4 according to the present invention.
Figure 13:
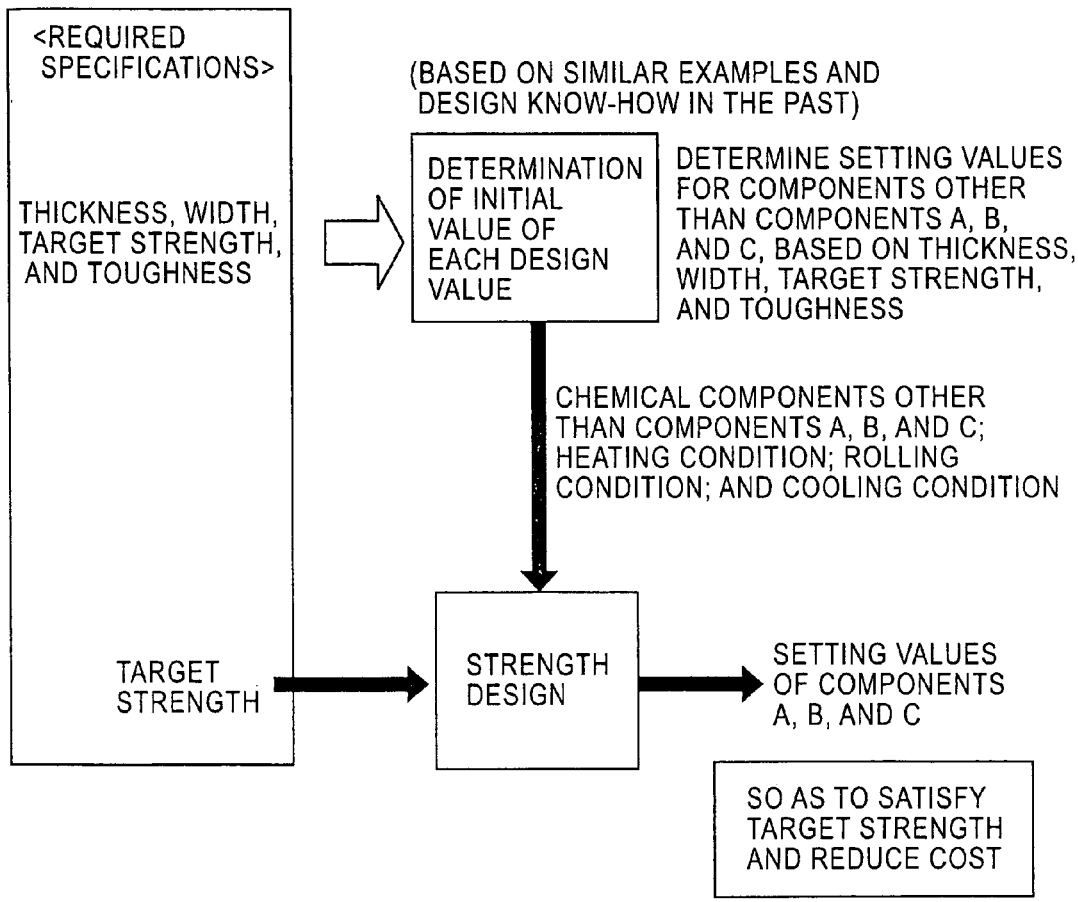
FIG. 13 is a block diagram showing the current steel plate material quality design.

In this embodiment, as illustrated in FIG. 12, two or more criterion functions (amount of deviation from past performance, in the figure) are shown together with raw data. The decision on which manufacturing condition to be selected is left to a designer. That is, the designer makes the final decision, and the present quality design support means contributes to decision-making support.

Figure 18:
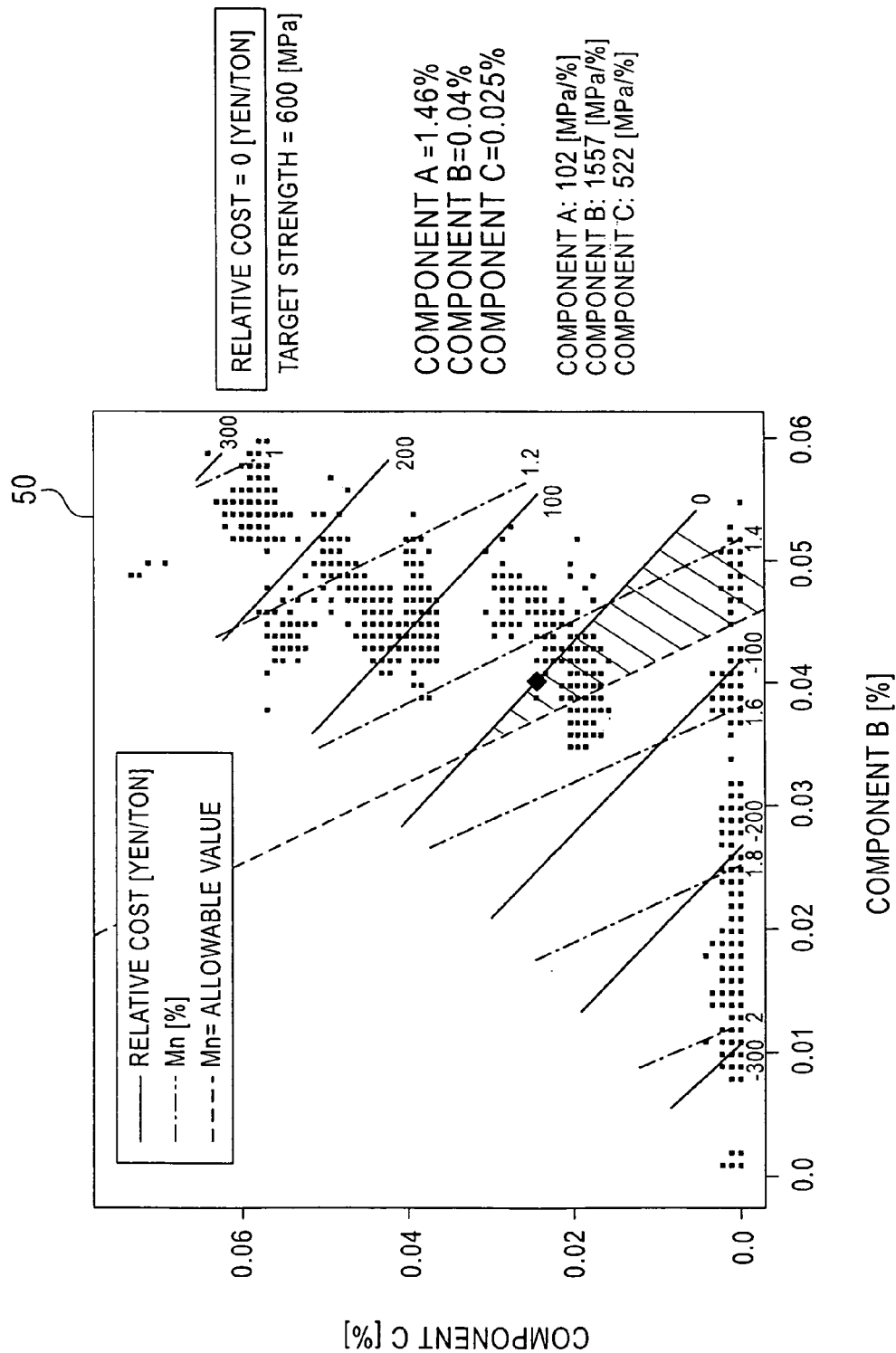
FIG. 18 is a diagram showing an example of a first state of the decision-making support screen in an embodiment of strength design.

The strength design of thin steel plates will be explained taking as an example, as shown in FIG. 18. The current thin steel plate quality design determines initial values of design values such as chemical components other than components A, B, and C; heating condition; rolling condition; and cooling condition by thickness, width, target strength, and toughness, on the basis of design examples and know-how in the past, in accordance with required specifications such as thickness, width, target strength, and toughness.

Then, a strength design setting components A, B, and C so as to satisfy the target strength and reduce costs.

Figure 14:
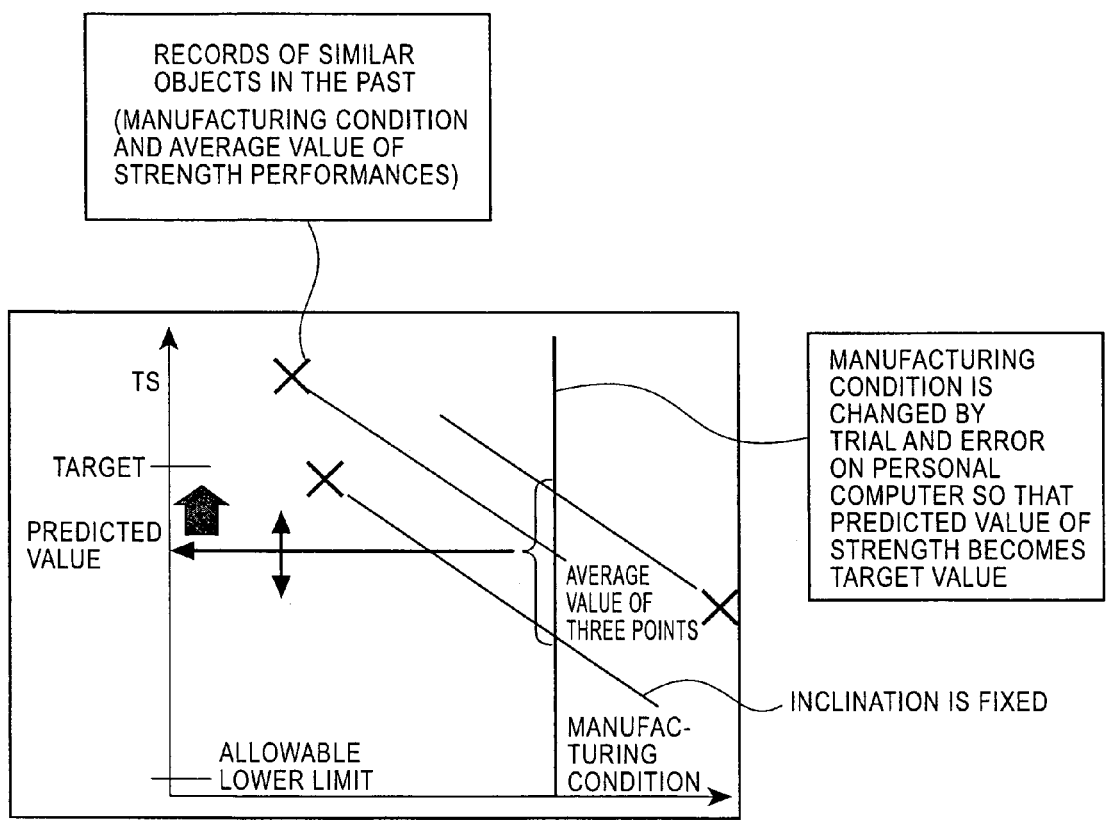
FIG. 14 is a diagram explaining the current steel plate material quality design.

Specifically, as shown in FIG. 14, based on records of past similar objects (manufacturing condition and an average value strength performance values in the past), the manufacturing condition is changed by trial and error on a personal computer 40 so that a predicted value of strength becomes a target value.

Figure 20:
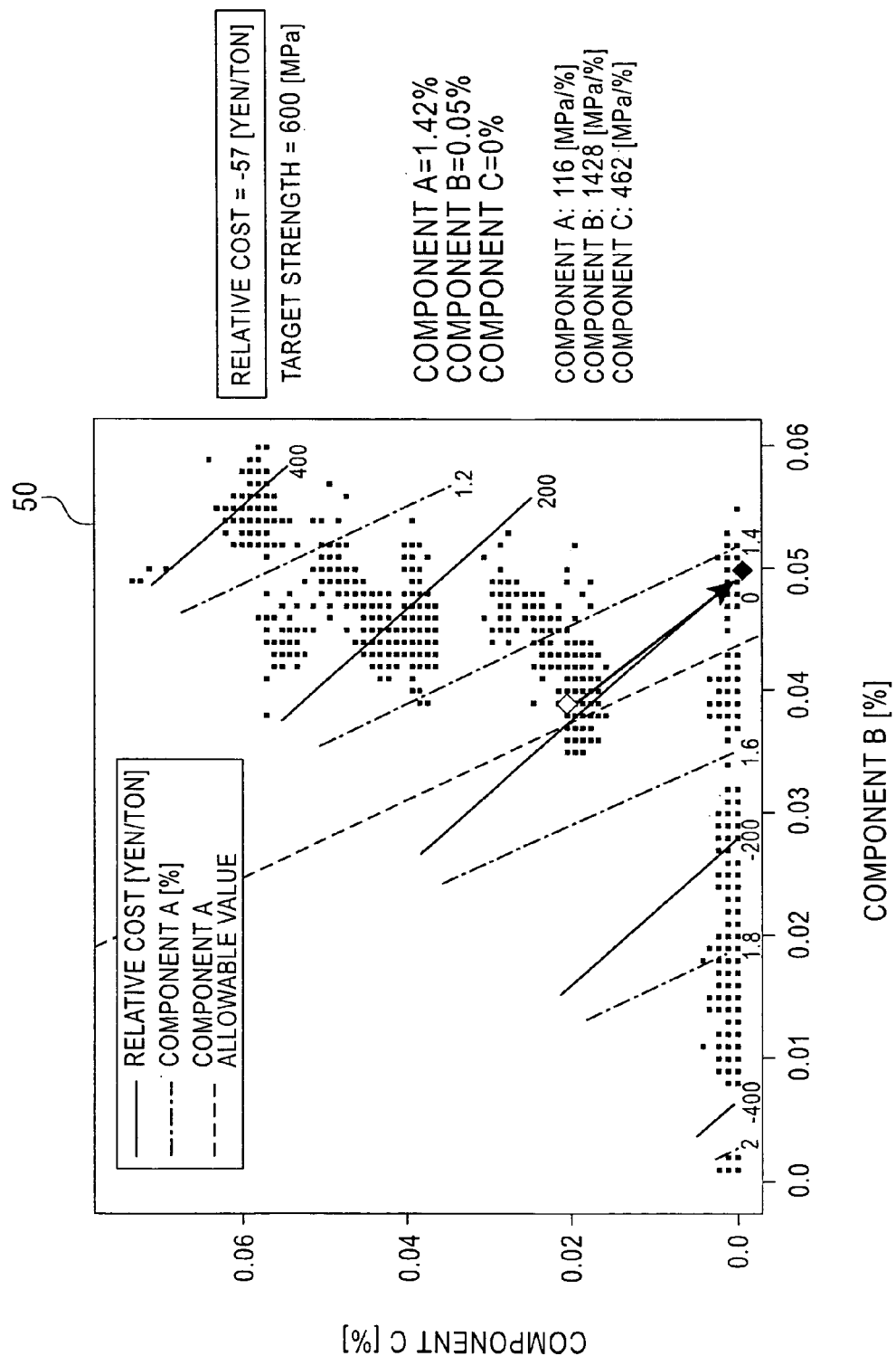
FIG. 20 is a diagram showing a state in FIG. 18, wherein the concentration of a component C is more lowered.

Influence coefficients with respect to the strengths of chemical components are: for example, A (MPa/%) for the component A, A2 (MPa/%) for the component B, A3 (MPa/%) for the component C (A2>A3>A1, and costs per strength of the chemical components are: B1 yen for component A, B2 yen for component B, B3 yen for component C (B3>>B2>B1). FIG. 20 shows an example of influence coefficient with respect to the strength of the component B.

Regarding the cost per strength, the component C is higher, and the component A and the component B are at almost the same level. It is therefore desirable to increase strength by the components A and B, and to cover shortfall in strength by the component C. Also, in order to allow slab diversion, it is desirable for the component B to be less than a certain allowable value as possible. Furthermore, in order to avid risks, it is desirable to follow past examples.

In this manner, there are problems as follows:
(1) Influence coefficients with respect to the strength are different depending upon the manufacturing condition space.
(2) Since the number of manufacturing conditions is large, and a target is nonlinear, it is difficult to determine an optimal value of the current design value. (3) There is no telling whether there exists a past example. Therefore, it is desirable to facilitate decision-making of the designer.

Figure 16:
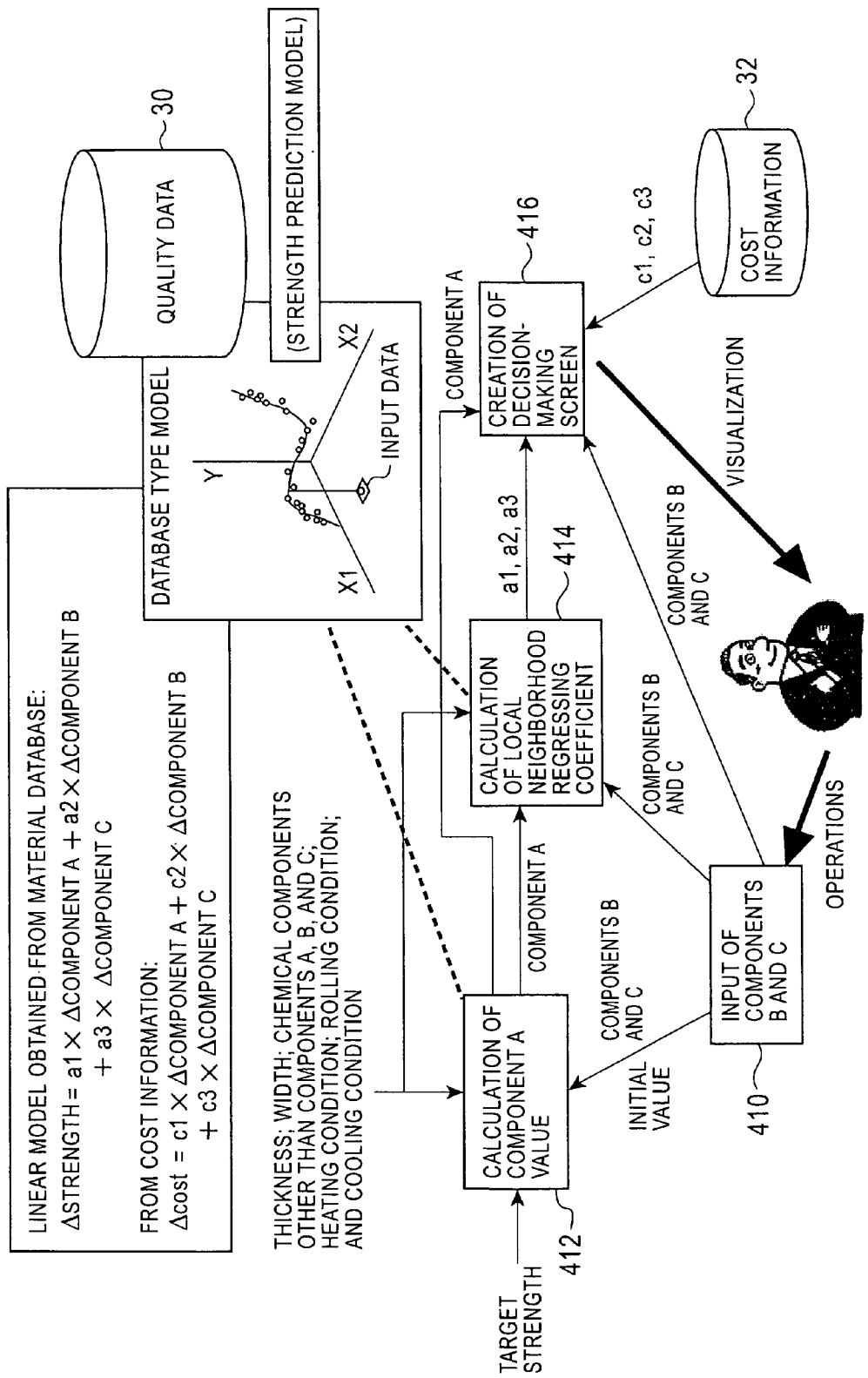
FIG. 16 is a block diagram showing a specific construction of Embodiment 4.

Accordingly, in the present embodiment, as shown in FIG. 16, there are provided with: the quality database (DB) 30 storing values of manufacturing conditions under which a product is manufactured, and quality characteristic value (performance value) at that time; the cost database DB 32 storing costs per unit amount of the manufacturing conditions; an input means 410 for inputting a value of manufacturing condition, optionally selected by the designer out of a plurality of manufacturing conditions; a manufacturing condition calculating means 412 for calculating manufacturing conditions other than the selected manufacturing condition such as to satisfy a required material characteristic value; an influence coefficient calculating means 414 for calculating local influence coefficient in the neighborhood of a manufacturing condition from the material DB 30 when the manufacturing condition value is given; and a support screen creating means 416 for creating screen 50 (shown in FIG. 17) supporting the decision-making of the designer, from the above-described manufacturing condition calculating means 412 and influence coefficient calculating means 414.

Figure 17:
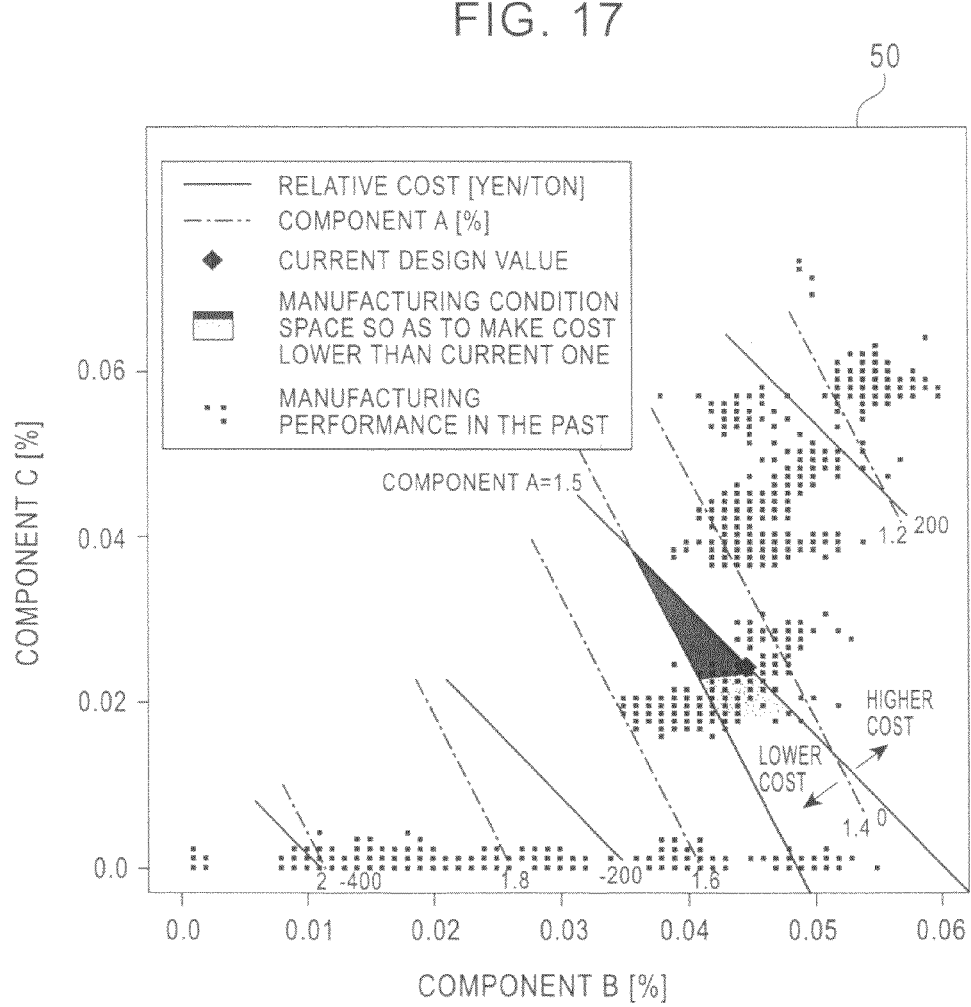
FIG. 17 is a diagram showing an example of decision-making support screen in Embodiment 4.

As illustrated in FIG. 17, the support screen creating means 416 is operative to display, in a selected manufacturing space, the current value of manufacturing condition, contour lines of costs, contour lines of values of the manufacturing conditions other than the selected manufacturing condition, such as to satisfy the required quality characteristic value, limited values of manufacturing conditions, and past performance values of the selected manufacturing condition.

Figure 15:
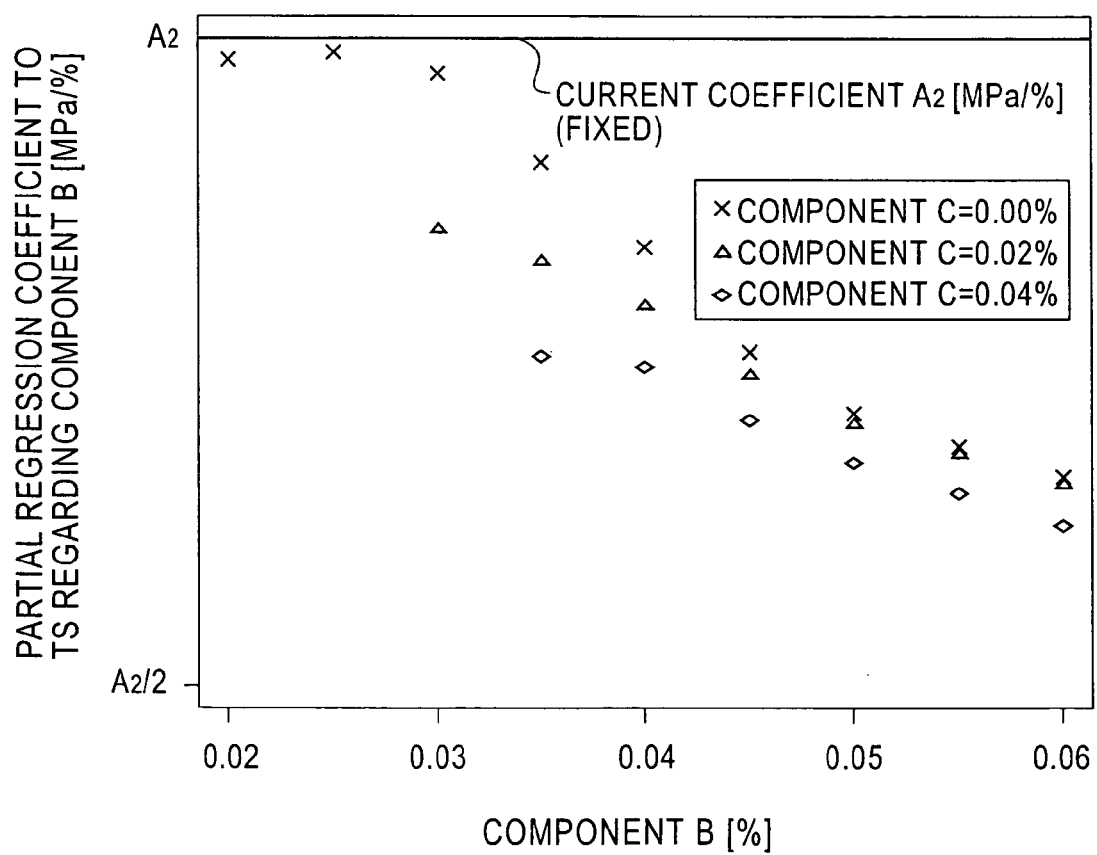
FIG. 15 is a diagram showing an example of the change in influence coefficient with respect to strength in the current steel plate material quality design.

On this decision-making support screen, the changing direction of manufacturing condition making cost lower than the current design value, and past performance values are simultaneously displayed. Also, contour lines of values of the component A with the same strength level, and contour lines of costs at that time are displayed. The influence coefficient change with respect to strength is shown in FIG. 15, taking the component B as an example. Test results are exhibited by symbol x (component C=0.00%), symbol Δ (component C=0.02%), and symbol ◇ (component C=0.04%). In this way, experimental knowledge that, as the concentration of the component B increases, the influence coefficient with respect to strength decreases, can be revealed, thus contributing to technological tradition.

Figure 19:
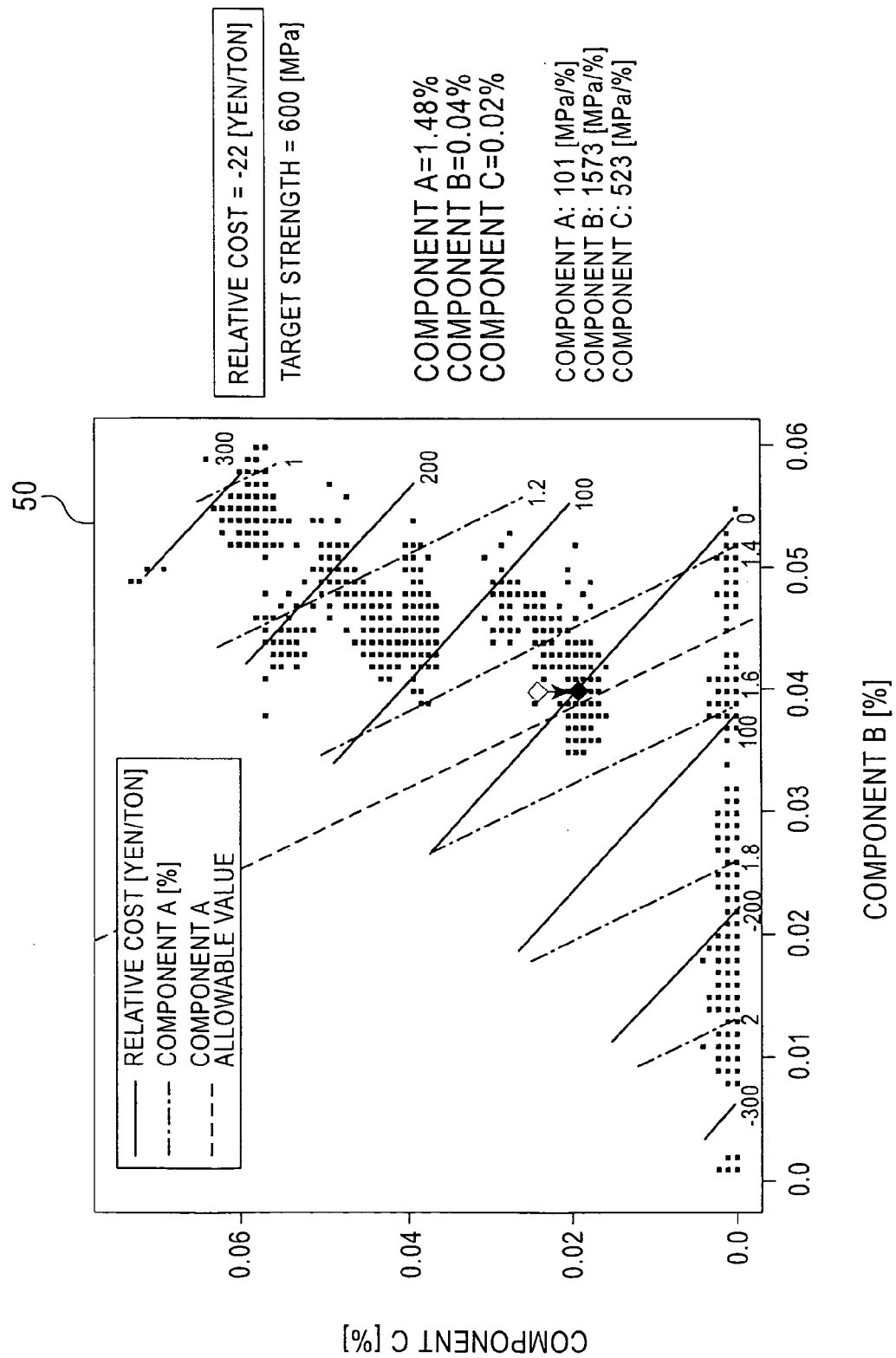
FIG. 19 is a diagram showing a state in FIG. 18, wherein the concentration of a component C is lowered.

Specific embodiment will be described below. When the first display screen is in a state as shown in FIG. 18, reducing the concentration of the component C of a set value indicated by symbol ✦ to thereby move it in the direction of cost reduction, results in the state shown in FIG. 19. From the state in FIG. 19, further reducing the concentration of the component C along contour lines until the component C becomes 0, results in the state shown in FIG. 20. This state in FIG. 20 shows optimal values.

In this manner, on the basis of the quality QB and cost information, by simultaneously visualizing costs and risks out of manufacturing conditions satisfying required specifications in nonlinear target, it is possible to support decision-making using general-purpose data analysis software. This allows the designer to easily research for lower cost manufacturing conditions. Furthermore, this prevents the designer from selecting manufacturing conditions by which he/she has never performed manufacturing in the past, thereby allowing a reduction in quality.

In the present embodiment, as criterion functions, risks fallen outside component costs and manufacturing setting values in the past have been considered, but the number and kinds of the criterion functions are not limited to the above-described ones.

The invention claimed is:

1. An apparatus for constructing a prediction model, comprising:
   an operational result database that relates manufacturing conditions of products manufactured in the past to result information on the manufacturing and that stores a plurality pieces of information obtained by relating the manufacturing conditions to the result information;
   similarity calculating means for calculating similarity composed of a plurality of comparison results by comparing the manufacturing conditions stored in the operational result database with a manufacturing condition of a prediction target; and
   prediction model constructing means for determining a parameter of a prediction model corresponding to the manufacturing condition of the prediction target,
   wherein the prediction model constructing means establishes a relationship between a manufacturing condition and a manufacturing result based on the manufacturing conditions and the result information of the operational result database, and wherein the prediction model constructing means comprises:
   means for eliminating, in a descending order, a predetermined number of manufacturing conditions stored in the operational result database and having values closest to a value of the manufacturing condition of the prediction target,
   means for using the similarity as a weight in an evaluation function for evaluating a modeling error of the result information, and
   means for using a physical characteristic of the prediction target as a constraint condition to thereby solve a mathematical programming problem concerning the evaluation function within the constraint condition.

2. The apparatus according to claim 1, further comprising a result prediction device which comprises:
   prediction model acquiring means for acquiring the prediction model corresponding to the manufacturing condition of the prediction target; and
   result prediction means for inputting the manufacturing condition of the prediction target into the prediction model to thereby predict a result corresponding to the manufacturing condition.

3. The apparatus according to claim 1, further comprising a control device for controlling the manufacturing condition, wherein the control device comprises:
   prediction model acquiring means for acquiring the prediction model corresponding to the manufacturing condition of the prediction target; and
   control means for performing control by calculating, using the prediction model, a control input such that a controlled variable becomes a target value with respect to the manufacturing condition of the prediction target.

4. The apparatus according to claim 1, further comprising a quality design device which comprises:
prediction model acquiring means for acquiring the prediction model corresponding to the manufacturing condition of the prediction target; and
quality design support means for supporting quality design of a product by outputting at least one output out of an output of a predicted result obtained by inputting at least one manufacturing condition into the prediction model, and an output of a secondary evaluation index calculated based on the predicted result.

5. A method for constructing a prediction model, comprising:
a similarity calculating step of comparing manufacturing conditions stored in an operational result database, that relates the manufacturing conditions of products manufactured in the past to result information on the manufacturing and that stores a plurality pieces of information obtained by relating the manufacturing conditions to the result information, with a manufacturing condition of a prediction target, to thereby calculate a similarity composed of a plurality of comparison results; and
a prediction model constructing step of using a manufacturing point corresponding to the manufacturing condition of the prediction target, as a reference,
wherein the prediction model constructing step establishes a relationship between a manufacturing condition and a manufacturing result based on the manufacturing conditions and the result information of the operational result database, and wherein the prediction model constructing step comprises:
a step of eliminating, in a descending order, a predetermined number of manufacturing conditions stored in the operational result database and having values closest to a value of the manufacturing condition of the prediction target,
a step of using the similarity as a weight of an evaluation function for evaluating a modeling error of the result information, and
a step of using a physical characteristic of the prediction target as a constraint condition to thereby solve a mathematical programming problem concerning the evaluation function within the constraint condition.

6. The method according to claim 5, further comprising a result prediction step which comprises:
a prediction model acquiring step of acquiring a prediction model corresponding to the manufacturing condition of the prediction target; and
a result prediction step of inputting the manufacturing condition of the prediction target into the prediction model to thereby predict a result corresponding to the manufacturing condition.

7. The method according to claim 5, further comprising a control step of controlling the manufacturing condition, wherein the control step comprises:
a prediction model acquiring step of acquiring a prediction model corresponding to the manufacturing condition of the prediction target; and
a control step of performing control by calculating, using the prediction model, a control input such that a controlled variable becomes a target value with respect to the manufacturing condition of the prediction target.

8. The method according to claim 5, further comprising a quality design step which comprises:
a prediction model acquiring step of acquiring a prediction model corresponding to the manufacturing condition of the prediction target; and
a quality design support step of supporting quality design of a product by outputting at least one output out of an output of a predicted result obtained by inputting at least one manufacturing condition into the prediction model, and an output of a secondary evaluation index calculated based on the predicted result.

* * * * *